United States Patent
Doan et al.

(10) Patent No.: US 9,838,513 B2
(45) Date of Patent: Dec. 5, 2017

(54) METHODS AND APPARATUS FOR PACKET ACQUISITION IN MIXED-RATE WIRELESS COMMUNICATION NETWORKS

(71) Applicant: QUALCOMM Incorporated, San Diego, CA (US)

(72) Inventors: Dung Ngoc Doan, San Diego, CA (US); Tao Tian, San Diego, CA (US); Sameer Vermani, San Diego, CA (US); Bin Tian, San Diego, CA (US); Lin Yang, San Diego, CA (US); Eric Pierre Rebeiz, Sunnyvale, CA (US); Rahul Tandra, San Diego, CA (US); Simone Merlin, San Diego, CA (US); Alfred Asterjadhi, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 14/856,351

(22) Filed: Sep. 16, 2015

(65) Prior Publication Data

US 2016/0088126 A1 Mar. 24, 2016

Related U.S. Application Data

(60) Provisional application No. 62/053,062, filed on Sep. 19, 2014, provisional application No. 62/104,626, filed on Jan. 16, 2015, provisional application No. 62/106,075, filed on Jan. 21, 2015.

(51) Int. Cl.
*H04L 29/06* (2006.01)
*H04W 72/04* (2009.01)
*H04L 27/26* (2006.01)

(52) U.S. Cl.
CPC .......... *H04L 69/22* (2013.01); *H04L 27/261* (2013.01); *H04W 72/04* (2013.01)

(58) Field of Classification Search
CPC ....... H04L 69/22; H04L 27/261; H04W 72/04
See application file for complete search history.

(56) References Cited

U.S. PATENT DOCUMENTS

| 2010/0309868 | A1 | 12/2010 | Yang et al. | |
|---|---|---|---|---|
| 2011/0199971 | A1* | 8/2011 | Kim | H04W 28/065 370/328 |
| 2011/0305296 | A1* | 12/2011 | Van Nee | H04L 5/0048 375/295 |

(Continued)

OTHER PUBLICATIONS

International Search Report and Written Opinion—PCT/US2015/050791—ISA/EPO—Dec. 1, 2015.

*Primary Examiner* — Brian D Nguyen
(74) *Attorney, Agent, or Firm* — Knobbe, Martens, Olson & Bear, LLP

(57) ABSTRACT

A method of wirelessly communicating a packet includes generating, at a first wireless device, a first packet including a first preamble decodable by a plurality of devices and a second preamble decodable by only a subset of the plurality of devices. The first preamble includes a first signal field. The second preamble includes a first training field. The method further includes transmitting the first packet concurrently with one or more second packets to be transmitted by wireless devices other than the first wireless device.

27 Claims, 12 Drawing Sheets

(56) References Cited

U.S. PATENT DOCUMENTS

| | | | |
|---|---|---|---|
| 2013/0128807 A1* | 5/2013 | Vermani | H04L 5/0053 |
| | | | 370/328 |
| 2013/0136075 A1* | 5/2013 | Yu | H04W 72/0453 |
| | | | 370/329 |
| 2013/0142115 A1* | 6/2013 | Yu | H04W 56/00 |
| | | | 370/328 |
| 2013/0176986 A1* | 7/2013 | Yu | H04W 72/08 |
| | | | 370/330 |
| 2013/0188572 A1* | 7/2013 | Cheong | H04W 72/04 |
| | | | 370/329 |
| 2014/0185695 A1* | 7/2014 | Kenney | H04L 27/2613 |
| | | | 375/260 |
| 2014/0211704 A1 | 7/2014 | Sampath et al. | |
| 2014/0328430 A1* | 11/2014 | Park | H04L 25/0224 |
| | | | 375/295 |
| 2014/0337690 A1* | 11/2014 | Zhang | H03M 13/2933 |
| | | | 714/776 |
| 2014/0362935 A1* | 12/2014 | Porat | H04L 27/2602 |
| | | | 375/260 |
| 2015/0063255 A1* | 3/2015 | Tandra | H04J 11/0023 |
| | | | 370/329 |
| 2015/0071372 A1* | 3/2015 | Zhang | H04L 27/2602 |
| | | | 375/295 |

* cited by examiner

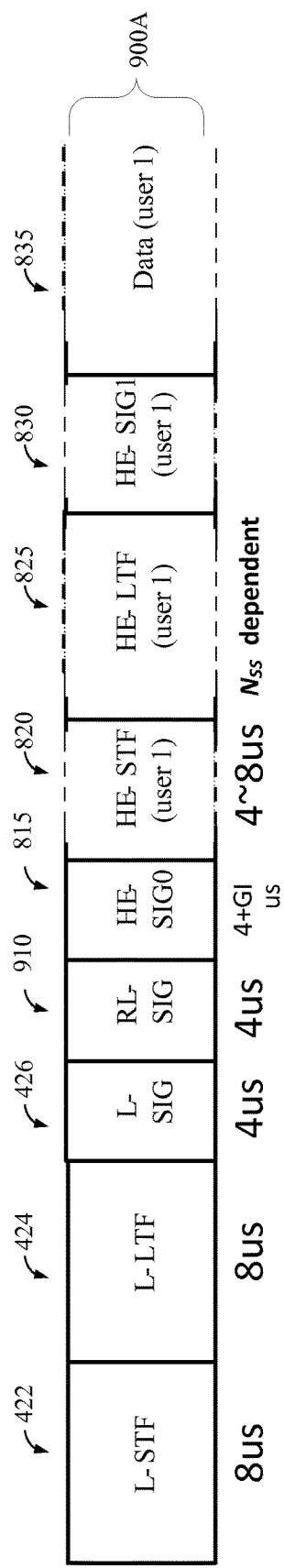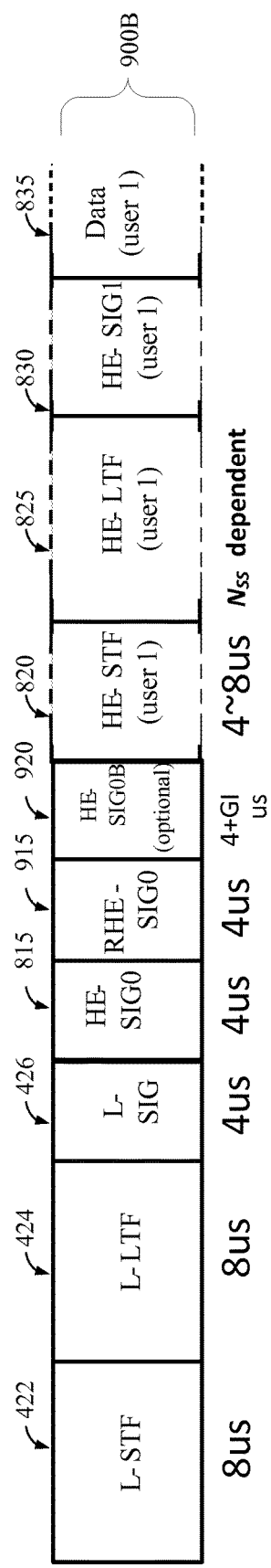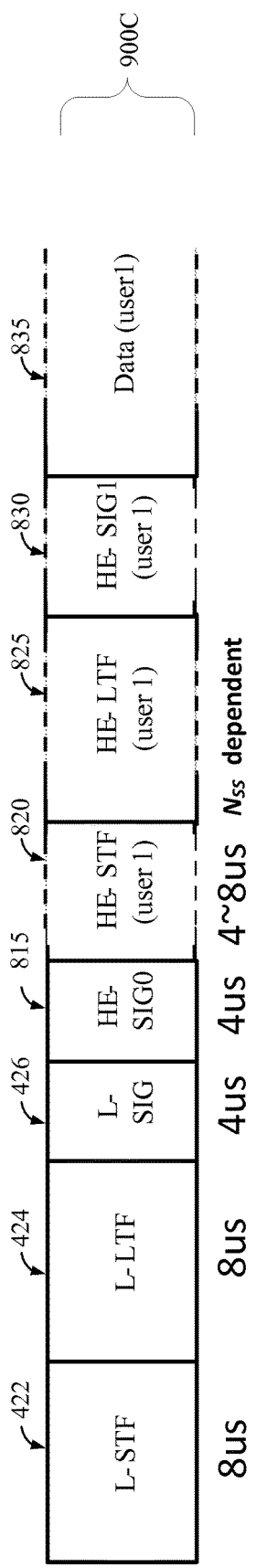

METHODS AND APPARATUS FOR PACKET ACQUISITION IN MIXED-RATE WIRELESS COMMUNICATION NETWORKS

PRIORITY CLAIM

This application claims the benefit of U.S. Provisional Application No. 62/053,062, filed Sep. 19, 2014, and U.S. Provisional Application No. 62/104,626, filed Jan. 16, 2015, and U.S. Provisional Application No. 62/106,075, filed Jan. 21, 2015, each of which are hereby incorporated herein by reference in its entirety.

FIELD

Certain aspects of the present disclosure generally relate to wireless communications, and more particularly, to methods and apparatus for mixed-rate communication in a wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

As the volume and complexity of information communicated wirelessly between multiple devices continues to increase, overhead bandwidth required for physical layer control signals continues to increase at least linearly. The number of bits utilized to convey physical layer control information has become a significant portion of required overhead. Thus, with limited communication resources, it is desirable to reduce the number of bits required to convey this physical layer control information, especially as multiple types of traffic are concurrently sent from an access point to multiple terminals. For example, when a wireless device sends low-rate uplink communications to an access point, it is desirable to minimize the number of bits used for signaling and packet acquisition while maintaining backwards compatibility. Thus, there is a need for an improved protocol for mixed-rate transmissions.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages can become apparent from the description, the drawings, and the claims. Note that the relative dimensions of the following figures may not be drawn to scale.

One aspect of the present disclosure provides a method of wireless communication. The method includes generating, at a first wireless device, a first packet including a first preamble decodable by a plurality of devices and a second preamble decodable by only a subset of the plurality of devices. The first preamble includes a first signal field. The second preamble includes a first training field. The method further includes transmitting the first packet concurrently with one or more second packets to be transmitted by wireless devices other than the first wireless device.

In various embodiments, the method can further include transmitting the first signal field over a channel bandwidth up to a full channel bandwidth size assigned to the first wireless device. In various embodiments, the method can further include, when the first wireless device is not assigned use of a channel designated as a primary channel, transmitting the first signal field over the channel designated as the primary channel. In various embodiments, the method can further include transmitting the first signal field over an available channel bandwidth including one or more channels not assigned for use by the first wireless device. In various embodiments, the available channel bandwidth can be an entirety of the available channel bandwidth.

In various embodiments, a length of the first packet can be shorter than a length of at least one second packet to be transmitted by a second wireless device assigned to a common zone with the first wireless device. The method can further include setting the first signal field to indicate a length of the first packet equal to a length of a longest of the at least one second packet to be transmitted by the second wireless device assigned to the common zone with the first wireless device. The method can further include padding the first packet for transmission to equal the length of the longest of the at least one second packet to be transmitted by the second wireless device assigned to the common zone with the first wireless device.

In various embodiments, a length of the first packet can be shorter than a length of at least one second packet to be transmitted by a second wireless device assigned to a different zone from the first wireless device. The method can further include setting the first signal field to indicate a length of the first packet equal to a length of a longest of the at least one second packet to be transmitted by the second wireless device being assigned to any zone including a commonly assigned zone with the first wireless device. The method can further include padding the first packet for transmission to equal the length of the longest of the at least one second packet to be transmitted by the second wireless device being assigned to any zone including a commonly assigned zone with the first wireless device.

In various embodiments, a length of the first packet can be shorter than a length of at least one second packet to be transmitted by a second wireless device. The method can further include the method can further include refraining from padding the first packet. In various embodiments, the second preamble can further include a second signal field.

In various embodiments, the second preamble can further include a second signal field that is one symbol in length. In various embodiments, the second preamble can further include a full or partial repetition of the first signal field, and a second signal field. In various embodiments, the method can further include encoding one or more bits in a polarity of the full or partial repetition of the first signal field.

In various embodiments, the second preamble can further include a repetition of even or odd tones of the first signal field, and a second signal field. In various embodiments, the second preamble can further include a second signal field and a repetition of the second signal field. In various embodiments, the second preamble can further include a second training field, the second training field shorter than the first training field.

In various embodiments, a length of the first training field can be shorter than a length of at least one training field to be transmitted by the second wireless device assigned to the common zone with the first wireless device. The method can further include padding the first training field to align a boundary of all training fields to be transmitted by the second wireless device assigned to the common zone with the first wireless device.

In various embodiments, a length of the first training field can be shorter than a length of at least one training field to be transmitted by a second wireless device being assigned to any zone including a commonly assigned zone with the first wireless device. The method can further include padding the first training field to align a boundary of all training fields to be transmitted by a second wireless device being assigned to any zone including a commonly assigned zone with the first wireless device.

In various embodiments, a length of the first training field can be shorter than a length of at least one training field to be transmitted by a second wireless device. The method can further include refraining from padding the first training field. In various embodiments, the second preamble can further include a second signal field, and may further comprise a repetition of the second signal field based, at least in part, on one of: a protection method used for a third signal field of the second portion; a compression method used for the first training field; and a prefix of a payload of the first packet.

In various embodiments, the first signal field can include an immediate response presence and/or duration indication. In various embodiments, the first signal field can include a transmit power indication. In various embodiments, the first signal field can include a partial time synchronization function (TSF).

In various embodiments, the first signal field can include a transmit opportunity (TXOP) bandwidth (BW) and/or primary channel offset indication. In various embodiments, the first signal field can include a partial base station identifier (BSSID). In various embodiments, the first signal field can include a partial receiver association identifier (AID).

In various embodiments, the first signal field can include a partial transmitter association identifier (AID). In various embodiments, the first signal field can include an uplink/downlink indication. In various embodiments, the uplink/downlink indication can be implicit in a transmitter or receiver association identifier (AID).

Another aspect provides an apparatus configured to wirelessly communicate. The apparatus includes a processor configured to generate a first packet including a first preamble decodable by a plurality of devices and a second preamble decodable by only a subset of the plurality of devices. The first preamble includes a first signal field. The second preamble includes a first training field. The apparatus further includes a transmitter configured to transmit the first packet concurrently with one or more second packets to be transmitted by wireless devices other than the apparatus.

In various embodiments, the transmitter can be further configured to transmit the first signal field over a channel bandwidth up to a fill channel bandwidth size assigned to the apparatus. In various embodiments, the transmitter can be further configured to, when the apparatus is not assigned a primary channel, transmit the first signal field over the channel designated as the primary channel. In various embodiments, the transmitter can be further configured to transmit the first signal field over an available channel bandwidth including one or more channels not assigned to the apparatus. In various embodiments, the available channel bandwidth can be an entirety of the available channel bandwidth.

In various embodiments, a length of the first packet can be shorter than a length of at least one second packet to be transmitted by a second wireless device assigned to a common zone with the apparatus. The processor can be further configured to set the first signal field to indicate a length of the first packet equal to a length of a longest of the at least one second packet to be transmitted by a second wireless device assigned to a common zone with the apparatus. In various embodiments, the processor can be further configured to pad the first packet to equal the length of the longest of the at least one second packet to be transmitted by a second wireless device assigned to a common zone with the apparatus.

In various embodiments, a length of the first packet can be shorter than a length of at least one second packet to be transmitted by a second wireless device assigned to a different zone from the apparatus. The processor can be further configured to set the first signal field to indicate a length of the first packet equal to a length of a longest of the at least one second packet to be transmitted by the second wireless device being assigned to any zone including a commonly assigned zone with the apparatus. In various embodiments, the processor can be further configured to pad the first packet to equal the length of the longest of the at least one second packet to be transmitted by the second wireless device being assigned to any zone including a commonly assigned zone with the apparatus.

In various embodiments, a length of the first packet can be shorter than a length of at least one second packet to be transmitted by a second wireless device. The processor can be further configured to refrain from padding the first packet. In various embodiments, the second preamble can further include a second signal field.

In various embodiments, the second preamble can further include a second signal field that is one symbol in length. In various embodiments, the second preamble can further include a full or partial repetition of the first signal field, and a second signal field. In various embodiments, the processor can be further configured to encode one or more bits in a polarity of the full or partial repetition of the first signal field.

In various embodiments, the second preamble can further include a repetition of even or odd tones of the first signal field, and a second signal field. In various embodiments, the second preamble can further include a second signal field and a repetition of the second signal field. In various embodiments, the second preamble can further include a second training field, the second training field shorter than the first training field.

In various embodiments, a length of the first training field can be shorter than a length of at least one training field to be transmitted by a second wireless device assigned to a common zone with the apparatus. The processor can be further configured to pad the first training field to align a boundary of all training fields to be transmitted by the second wireless device assigned to the common zone with the apparatus.

In various embodiments, a length of the first training field can be shorter than a length of at least one training field to be transmitted by a second wireless device being assigned to any zone including a commonly assigned zone with the apparatus. The processor can be further configured to pad the first training field to align a boundary of all training fields to be transmitted by a second wireless device being assigned to any zone including a commonly assigned zone with the apparatus.

In various embodiments, a length of the first training field can be shorter than a length of at least one training field to be transmitted by a second wireless device. The processor can be further configured to refrain from padding the first training field. In various embodiments, the second preamble can further include a second signal field, and may further comprise a repetition of the second signal field based, at least in part, on one of: a protection method used for a third signal field of the second portion; a compression method used for the first training field; and a prefix of a payload of the first packet.

In various embodiments, the first signal field can include an immediate response presence and/or duration indication. In various embodiments, the first signal field can include a transmit power indication. In various embodiments, the first signal field can include a partial time synchronization function (TSF).

In various embodiments, the first signal field can include a transmit opportunity (TXOP) bandwidth (BW) and/or primary channel offset indication. In various embodiments, the first signal field can include a partial base station identifier (BSSID). In various embodiments, the first signal field can include a partial receiver association identifier (AID).

In various embodiments, the first signal field can include a partial transmitter association identifier (AID). In various embodiments, the first signal field can include an uplink/downlink indication. In various embodiments, the uplink/downlink indication can be implicit in a transmitter or receiver association identifier (AID).

Another aspect provides another apparatus for wireless communication. The apparatus includes means for generating a first packet including a first preamble decodable by a plurality of devices and a second preamble decodable by only a subset of the plurality of devices. The first preamble includes a first signal field. The second preamble includes a first training field. The apparatus further includes means for transmitting the first packet concurrently with one or more second packets to be transmitted by wireless devices other than the apparatus.

In various embodiments, the apparatus can further include means for transmitting the first signal field over a channel bandwidth up to a full channel bandwidth size assigned to the apparatus. In various embodiments, the apparatus can further include means for, when the apparatus is not assigned a primary channel, transmitting the first signal field over the channel designated as the primary channel. In various embodiments, the apparatus can further include means for transmitting the first signal field over an available channel bandwidth including one or more channels not assigned to the apparatus. In various embodiments, the available channel bandwidth can be an entirety of the available channel bandwidth.

In various embodiments, a length of the first packet can be shorter than a length of at least one second packet to be transmitted by a second wireless device assigned to a common zone with the apparatus. The apparatus can further include means for setting the first signal field to indicate a length of the first packet equal to a length of a longest of the at least one second packet to be transmitted by a second wireless device assigned to a common zone with the apparatus. The apparatus can further include means for padding the first packet for transmission to equal the length of the longest of the at least one second packet to be transmitted by a second wireless device assigned to a common zone with the apparatus.

In various embodiments, a length of the first packet can be shorter than a length of at least one second packet to be transmitted by a second wireless device assigned to a different zone from the apparatus. The apparatus can further include means for setting the first signal field to indicate a length of the first packet equal to a length of a longest of the at least one second packet to be transmitted by the second wireless device being assigned to any zone including a commonly assigned zone with the apparatus. The apparatus can further include means for padding the first packet for transmission to equal the length of the longest of the at least one second packet to be transmitted by the second wireless device being assigned to any zone including a commonly assigned zone with the apparatus.

In various embodiments, a length of the first packet can be shorter than a length of at least one second packet to be transmitted by a second wireless device. The apparatus can further include means for refraining from padding the first packet. In various embodiments, the second preamble can further include a second signal field.

In various embodiments, the second preamble can further include a second signal field that is one symbol in length. In various embodiments, the second preamble can further include a full or partial repetition of the first signal field, and a second signal field. In various embodiments, the apparatus can further include means for encoding one or more bits in a polarity of the full or partial repetition of the first signal field.

In various embodiments, the second preamble can further include a repetition of even or odd tones of the first signal field, and a second signal field. In various embodiments, the second preamble can further include a second signal field and a repetition of the second signal field. In various embodiments, the second preamble can further include a second training field, the second training field shorter than the first training field.

In various embodiments, a length of the first training field can be shorter than a length of at least one training field to be transmitted by a second wireless device assigned to a common zone with the apparatus. The apparatus can further include means for padding the first training field to align a boundary of all training fields to be transmitted by the second wireless device assigned to the common zone with the apparatus.

In various embodiments, a length of the first training field can be shorter than a length of at least one training field to be transmitted by a second wireless device being assigned to any zone including a commonly assigned zone with the apparatus. The apparatus can further include means for padding the first training field to align a boundary of all training fields to be transmitted by a second wireless device being assigned to any zone including a commonly assigned zone with the apparatus.

In various embodiments, a length of the first training field can be shorter than a length of at least one training field to be transmitted by a second wireless device. The apparatus can further include means for refraining from padding the first training field. In various embodiments, the second preamble can further include a second signal field, and may further comprise a repetition of the second signal field based, at least in part, on one of: a protection method used for a third signal field of the second portion; a compression method used for the first training field; and a prefix of a payload of the first packet.

In various embodiments, the first signal field can include an immediate response presence and/or duration indication. In various embodiments, the first signal field can include a transmit power indication. In various embodiments, the first signal field can include a partial time synchronization function (TSF).

In various embodiments, the first signal field can include a transmit opportunity (TXOP) bandwidth (BW) and/or primary channel offset indication. In various embodiments, the first signal field can include a partial base station identifier (BSSID). In various embodiments, the first signal field can include a partial receiver association identifier (AID).

In various embodiments, the first signal field can include a partial transmitter association identifier (AID). In various embodiments, the first signal field can include an uplink/downlink indication. In various embodiments, the uplink/downlink indication can be implicit in a transmitter or receiver association identifier (AID).

Another aspect provides a non-transitory computer-readable medium. The medium includes code that, when executed, causes an apparatus to generate a first packet including a first preamble decodable by a plurality of devices and a second preamble decodable by only a subset of the plurality of devices. The first preamble includes a first signal field. The second preamble includes a first training field. The medium further includes code that, when executed, causes the apparatus to transmit the first packet concurrently with one or more second packets to be transmitted by wireless devices other than the apparatus.

In various embodiments, the apparatus can further include code that, when executed, causes the apparatus to transmit the first signal field over a channel bandwidth up to a fill channel bandwidth size assigned to the apparatus. In various embodiments, the apparatus can further include code that, when executed, causes the apparatus to, when the apparatus is not assigned a primary channel, transmit the first signal field over the channel designated as the primary channel. In various embodiments, the apparatus can further include code that, when executed, causes the apparatus to transmit the first signal field over an available channel bandwidth including one or more channels not assigned to the apparatus. In various embodiments, the available channel bandwidth can be an entirety of the available channel bandwidth.

In various embodiments, a length of the first packet can be shorter than a length of at least one second packet to be transmitted by a second wireless device assigned to a common zone with the apparatus. The medium further includes code that, when executed, causes the apparatus to set the first signal field to indicate a length of the first packet equal to a length of a longest of the at least one second packet to be transmitted by a second wireless device assigned to a common zone with the apparatus. In various embodiments, the apparatus can further include code that, when executed, causes the apparatus to pad the first packet to equal the length of the longest of the at least one second packet to be transmitted by a second wireless device assigned to a common zone with the apparatus.

In various embodiments, a length of the first packet can be shorter than a length of at least one second packet to be transmitted by a second wireless device assigned to a different zone from the apparatus. The medium further includes code that, when executed, causes the apparatus to further including code that, when executed, causes the apparatus to set the first signal field to indicate a length of the first packet equal to a length of a longest of the at least one second packet to be transmitted by the second wireless device being assigned to any zone including a commonly assigned zone with the apparatus. In various embodiments, the apparatus can further include code that, when executed, causes the apparatus to pad the first packet to equal the length of the longest of the at least one second packet to be transmitted by the second wireless device being assigned to any zone including a commonly assigned zone with the apparatus.

In various embodiments, a length of the first packet can be shorter than a length of at least one second packet to be transmitted by a second wireless device. The medium further includes code that, when executed, causes the apparatus to refrain from padding the first packet. In various embodiments, the second preamble can further include a second signal field.

In various embodiments, the second preamble can further include a second signal field that is one symbol in length. In various embodiments, the second preamble can further include a full or partial repetition of the first signal field, and a second signal field. In various embodiments, the medium can further include code that, when executed, causes the apparatus to encode one or more bits in a polarity of the full or partial repetition of the first signal field.

In various embodiments, the second preamble can further include a repetition of even or odd tones of the first signal field, and a second signal field. In various embodiments, the second preamble can further include a second signal field and a repetition of the second signal field. In various embodiments, the second preamble can further include a second training field, the second training field shorter than the first training field.

In various embodiments, a length of the first training field can be shorter than a length of at least one training field to be transmitted by a second wireless device assigned to a common zone with the apparatus. The medium further includes code that, when executed, causes the apparatus to pad the first training field to align a boundary of all training fields to be transmitted by the second wireless device assigned to the common zone with the apparatus.

In various embodiments, a length of the first training field can be shorter than a length of at least one training field to be transmitted by a second wireless device being assigned to any zone including a commonly assigned zone with the apparatus. The medium further includes code that, when executed, causes the apparatus to pad the first training field to align a boundary of all training fields to be transmitted by a second wireless device being assigned to any zone including a commonly assigned zone with the apparatus.

In various embodiments, a length of the first training field can be shorter than a length of at least one training field to be transmitted by a second wireless device. The medium further includes code that, when executed, causes the apparatus to refrain from padding the first training field. In various embodiments, the second preamble can further include a second signal field, and may further comprise a repetition of the second signal field based, at least in part, on one of: a protection method used for a third signal field of the second portion; a compression method used for the first training field; and a prefix of a payload of the first packet.

In various embodiments, the first signal field can include an immediate response presence and/or duration indication. In various embodiments, the first signal field can include a transmit power indication. In various embodiments, the first signal field can include a partial time synchronization function (TSF).

In various embodiments, the first signal field can include a transmit opportunity (TXOP) bandwidth (BW) and/or primary channel offset indication. In various embodiments, the first signal field can include a partial base station identifier (BSSID). In various embodiments, the first signal field can include a partial receiver association identifier (AID).

In various embodiments, the first signal field can include a partial transmitter association identifier (AID). In various embodiments, the first signal field can include an uplink/downlink indication. In various embodiments, the uplink/downlink indication can be implicit in a transmitter or receiver association identifier (AID).

BRIEF DESCRIPTION OF THE DRAWINGS

FIG. 9A illustrates an exemplary structure of an uplink physical-layer packet which can be used to enable wireless communications.

FIG. 9B illustrates another exemplary structure of an uplink physical-layer packet which can be used to enable wireless communications.

FIG. 9C illustrates another exemplary structure of an uplink physical-layer packet which can be used to enable wireless communications.

DETAILED DESCRIPTION

Figure 1:
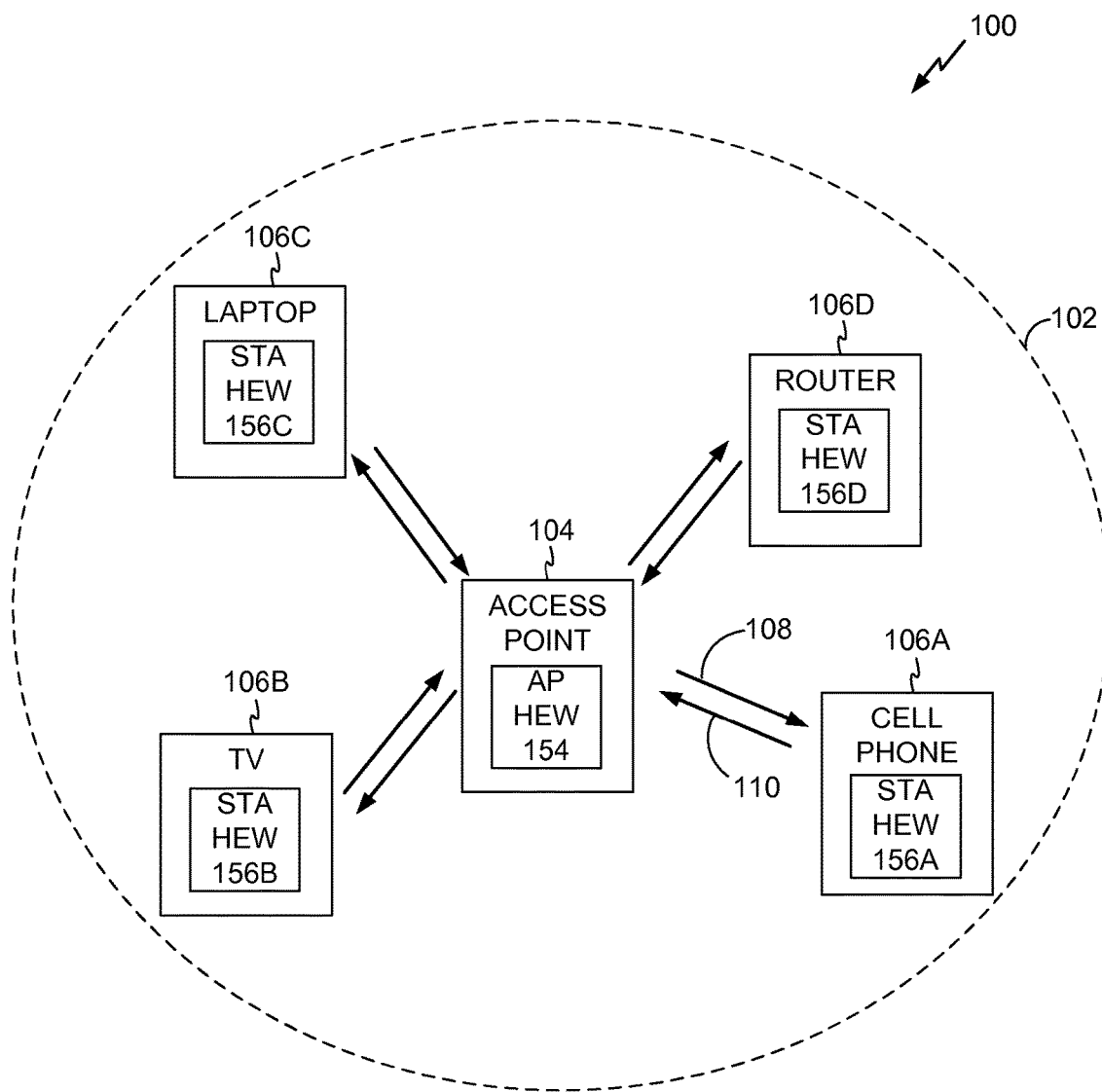
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosed can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as WiFi or, more generally, any member of the IEEE 802.11 family of wireless protocols. For example, the various aspects described herein can be used as part of an IEEE 802.11 protocol, such as an 802.11 protocol which supports orthogonal frequency-division multiple access (OFDMA) communications.

It can be beneficial to allow multiple devices, such as stations (STAs), to communicate with an AP at the same time. For example, this can allow multiple STAs to receive a response from the AP in less time, and to be able to transmit and receive data from the AP with less delay. This can also allow an AP to communicate with a larger number of devices overall, and can also make bandwidth usage more efficient. By using multiple access communications, the AP can be able to multiplex orthogonal frequency-division multiplexing (OFDM) symbols to, for example, four devices at once over an 80 MHz bandwidth, where each device utilizes 20 MHz bandwidth. Thus, multiple access communications can be beneficial in some aspects, as it can allow the AP to make more efficient use of the spectrum available to it.

It has been proposed to implement such multiple access protocols in an OFDM system such as the 802.11 family by assigning different subcarriers (or tones) of symbols transmitted between the AP and the STAs to different STAs. In this way, an AP could communicate with multiple STAs with a single transmitted OFDM symbol, where different tones of the symbol were decoded and processed by different STAs, thus allowing simultaneous data transfer to multiple STAs. These systems are sometimes referred to as OFDMA systems.

Such a tone allocation scheme is referred to herein as a "high-efficiency" (HE) system, and data packets transmitted in such a multiple tone allocation system can be referred to as high-efficiency (HE) packets. Various structures of such packets, including backward compatible preamble fields are described in detail below.

Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies can include various types of wireless local area networks (WLANs). A WLAN can be used to interconnect nearby devices together, employing widely used networking protocols. The various aspects described herein can apply to any communication standard, such as a wireless protocol.

In some aspects, wireless signals can be transmitted according to an 802.11 protocol. In some implementations, a WLAN includes various devices which are the components that access the wireless network. For example, there can be two types of devices: access points (APs) and clients (also referred to as stations, or STAs). In general, an AP can serve as a hub or base station for the WLAN and an STA serves as a user of the WLAN. For example, an STA can be a laptop computer, a personal digital assistant (PDA), a mobile phone, etc. In an example, an STA connects to an AP via a WiFi compliant wireless link to obtain general connectivity to the Internet or to other wide area networks. In some implementations an STA can also be used as an AP.

An access point (AP) can also include, be implemented as, or known as a base station, wireless access point, access node or similar terminology.

A station "STA" can also include, be implemented as, or known as an access terminal (AT), a subscriber station, a subscriber unit, a mobile station, a remote station, a remote terminal, a user terminal, a user agent, a user device, user equipment, or some other terminology. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured for network communication via a wireless medium.

As discussed above, certain of the devices described herein can implement an 802.11 standard, for example. Such devices, whether used as an STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

FIG. 1 illustrates an example of a wireless communication system 100 in which aspects of the present disclosure can be employed. The wireless communication system 100 can operate pursuant to a wireless standard, for example at least one of the 802.11ah, 802.11ac, 802.11n, 802.11g and 802.11b standards. The wireless communication system 100 can operate pursuant to a high-efficiency wireless standard, for example the 802.11ax standard. The wireless communication system 100 can include an AP 104, which communicates with STAs 106A-106D (which can be generically referred to herein as STA(s) 106).

A variety of processes and methods can be used for transmissions in the wireless communication system 100 between the AP 104 and the STAs 106A-106D. For example, signals can be sent and received between the AP 104 and the STAs 106A-106D in accordance with OFDM/OFDMA techniques. If this is the case, the wireless communication system 100 can be referred to as an OFDM/OFDMA system. Alternatively, signals can be sent and received between the AP 104 and the STAs 106A-106D in accordance with code division multiple access (CDMA) techniques. If this is the case, the wireless communication system 100 can be referred to as a CDMA system.

A communication link that facilitates transmission from the AP 104 to one or more of the STAs 106A-106D can be referred to as a downlink (DL) 108, and a communication link that facilitates transmission from one or more of the STAs 106A-106D to the AP 104 can be referred to as an uplink (UL) 110. Alternatively, a downlink 108 can be referred to as a forward link or a forward channel, and an uplink 110 can be referred to as a reverse link or a reverse channel.

The AP 104 can act as a base station and provide wireless communication coverage in a basic service area (BSA) 102. The AP 104 along with the STAs 106A-106D associated with the AP 104 and that use the AP 104 for communication can be referred to as a basic service set (BSS). It can be noted that the wireless communication system 100 may not have a central AP 104, but rather can function as a peer-to-peer network between the STAs 106A-106D. Accordingly, the functions of the AP 104 described herein can alternatively be performed by one or more of the STAs 106A-106D.

In some aspects, a STA 106 can be required to associate with the AP 104 in order to send communications to and/or receive communications from the AP 104. In one aspect, information for associating is included in a broadcast by the AP 104. To receive such a broadcast, the STA 106 can, for example, perform a broad coverage search over a coverage region. A search can also be performed by the STA 106 by sweeping a coverage region in a lighthouse fashion, for example. After receiving the information for associating, the STA 106 can transmit a reference signal, such as an association probe or request, to the AP 104. In some aspects, the AP 104 can use backhaul services, for example, to communicate with a larger network, such as the Internet or a public switched telephone network (PSTN).

In an embodiment, the AP 104 includes an AP high efficiency wireless controller (HEW) 154. The AP HEW 154 can perform some or all of the operations described herein to enable communications between the AP 104 and the STAs 106A-106D using the 802.11 protocol. The functionality of the AP HEW 154 is described in greater detail below with respect to FIGS. 4-20.

Alternatively or in addition, the STAs 106A-106D can include a STA HEW 156. The STA HEW 156 can perform some or all of the operations described herein to enable communications between the STAs 106A-106D and the AP 104 using the 802.11 protocol. The functionality of the STA HEW 156 is described in greater detail below with respect to FIGS. 2-11.

Figure 2:
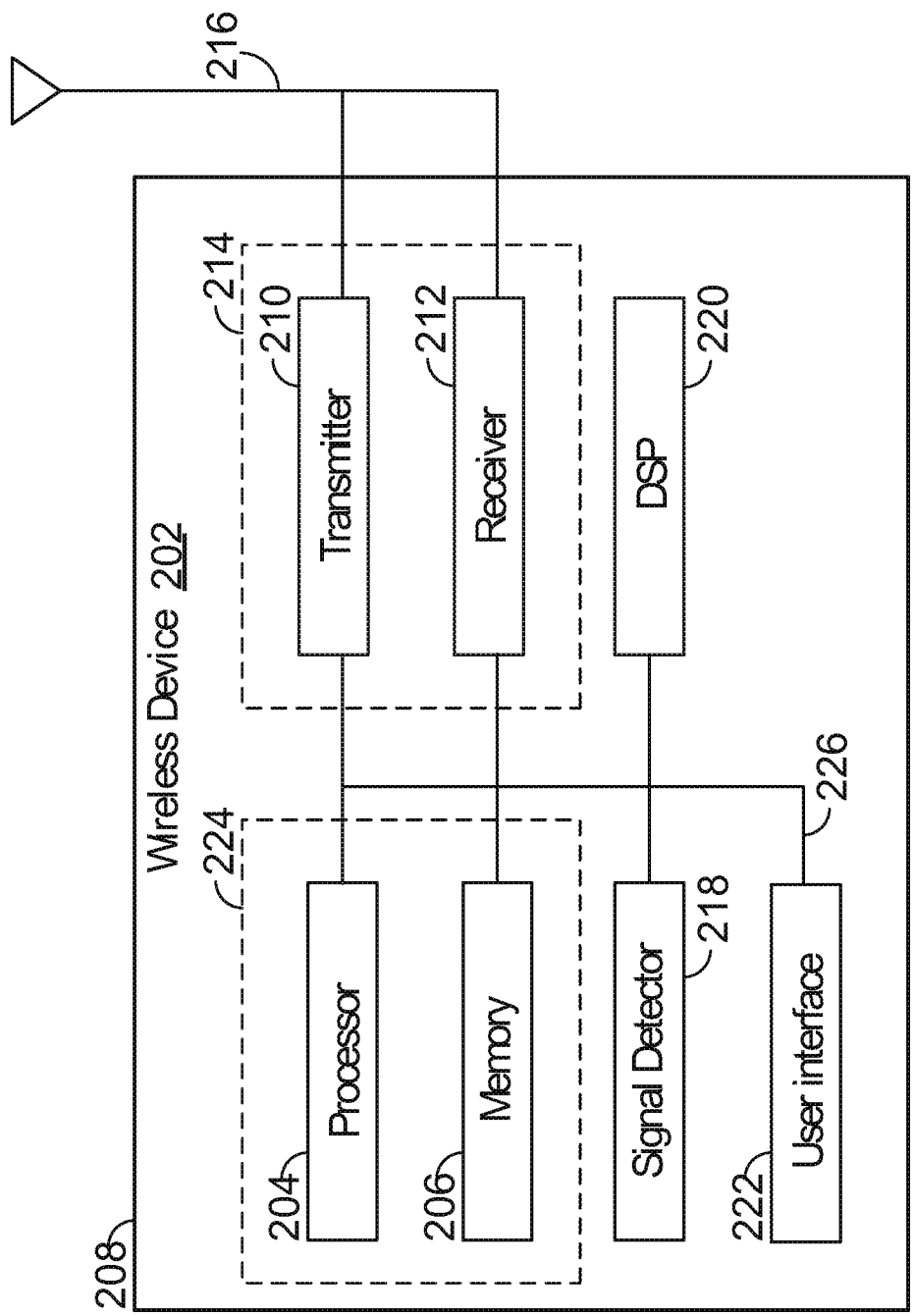
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100 of FIG. 1. The wireless device 202 is an example of a device that can be configured to implement the various methods described herein. For example, the wireless device 202 can include the AP 104 or one of the STAs 106A-106D.

The wireless device 202 can include a processor 204 which controls operation of the wireless device 202. The processor 204 can also be referred to as a central processing unit (CPU) or hardware processor. Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 204 or the processor 204 and the memory 206 can correspond to the packet generator 124 of FIG. 1, which can be utilized to generate a packet including a value in a packet type field and to allocate a plurality of bits of the packet to each of a plurality of subsequent fields based at least in part on the value in the packet type field, as can be described in more detail below.

The processing system can also include non-transitory machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during multiple-input multiple-output (MIMO) communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can include a physical layer data unit (PPDU). In some aspects, the PPDU is referred to as a packet.

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art can appreciate the components of the wireless device 202 can be coupled together or accept or provide inputs to each other using some other mechanism.

Although a number of separate components are illustrated in FIG. 2, those of skill in the art can recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can include the AP 104 or one of the STAs 106A-106D, and can be used to transmit and/or receive communications. The communications exchanged between devices in a wireless network can include data units which can include packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Figure 3:
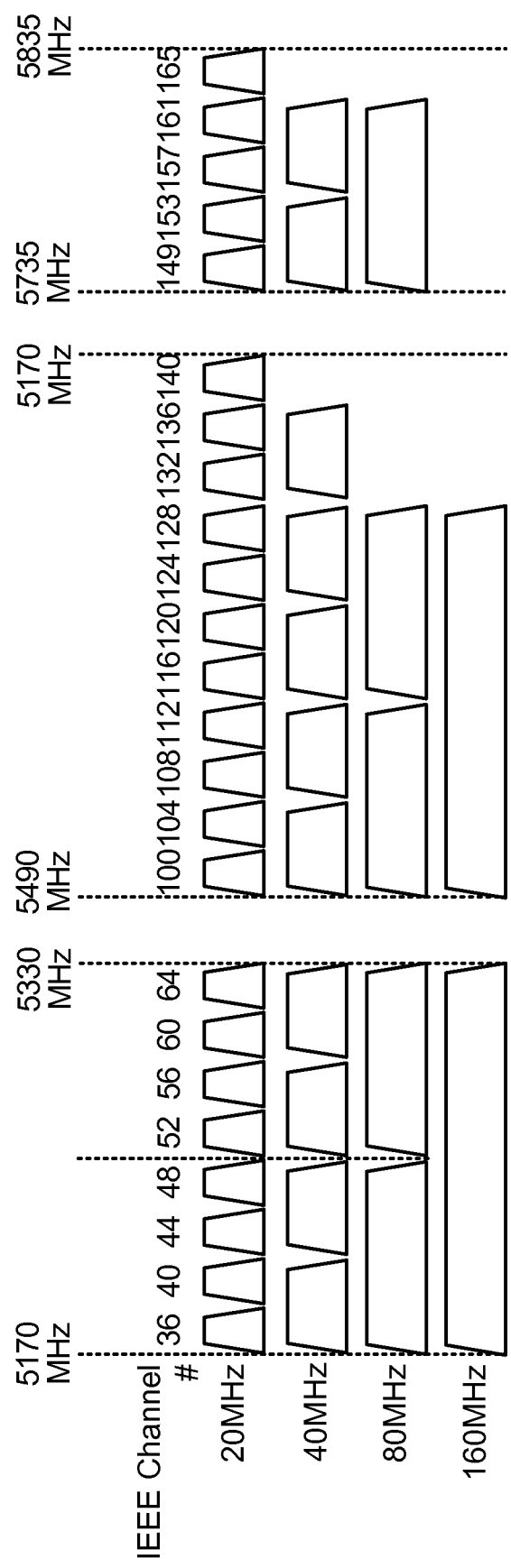
FIG. 3 illustrates a channel allocation for channels available for 802.11 systems.

FIG. 3 illustrates a channel allocation for channels available for 802.11 systems. Various IEEE 802.11 systems support a number of different sizes of channels, such as 5, 10, 20, 40, 80, and 160 MHz channels. For example, and 802.11ac device can support 20, 40, and 80 MHz channel bandwidth reception and transmission. A larger channel can include two adjacent smaller channels. For example, an 80 MHz channel can include two adjacent 40 MHz channels. In the currently implemented IEEE 802.11 systems, a 20 MHz channel contains 64 subcarriers, separated from each other by 312.5 kHz. Of these subcarriers, a smaller number can be used for carrying data. For example, a 20 MHz channel can contain transmitting subcarriers numbered −1 to −28 and 1 to 28, or 56 subcarriers. Some of these carriers can also be used to transmit pilot signals.

Figure 4:
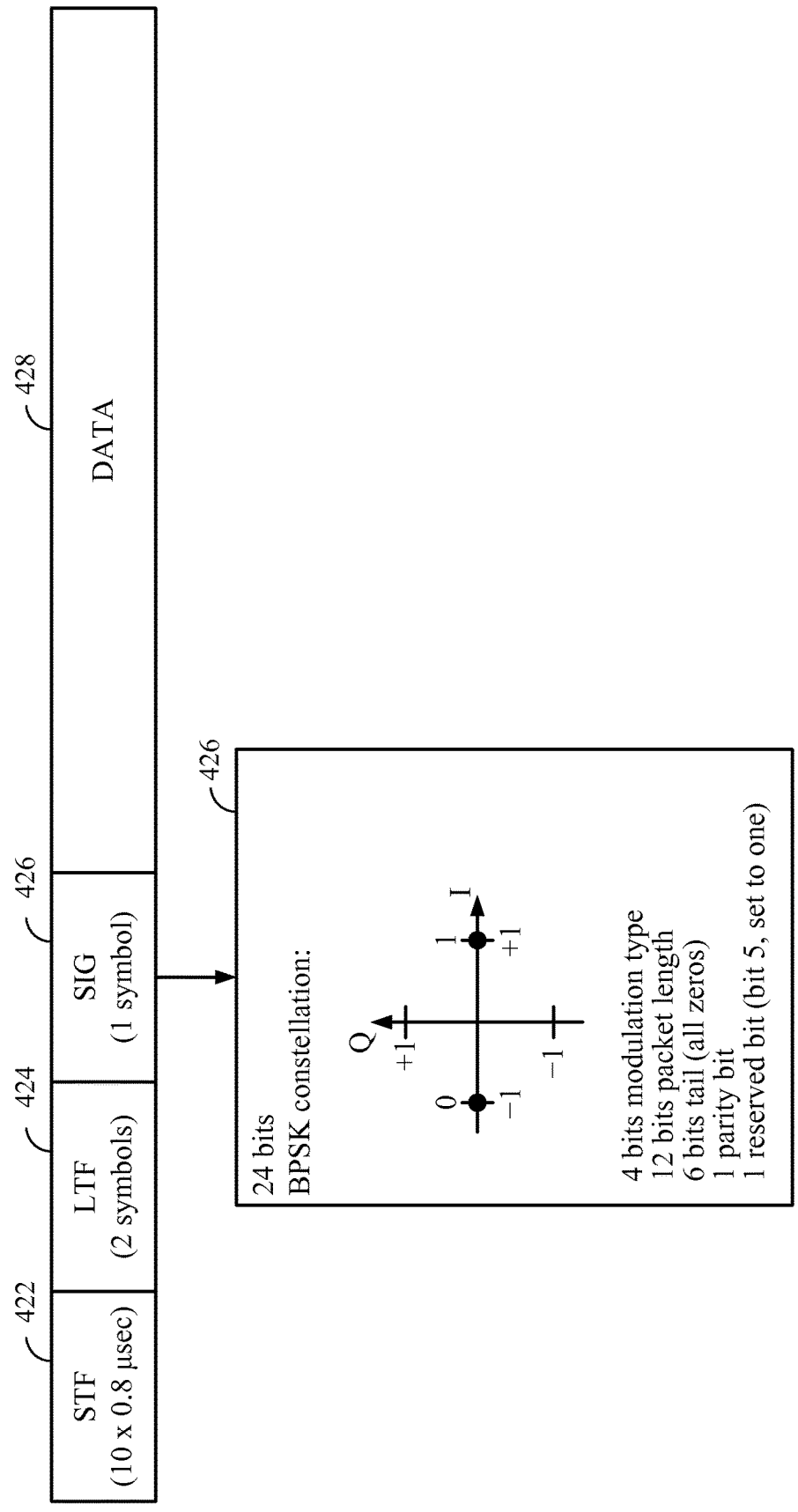
FIGS. 4 and 5 illustrate data packet formats for several currently existing Institute of Electrical and Electronics Engineers (IEEE) 802.11 standards.
Figure 5:
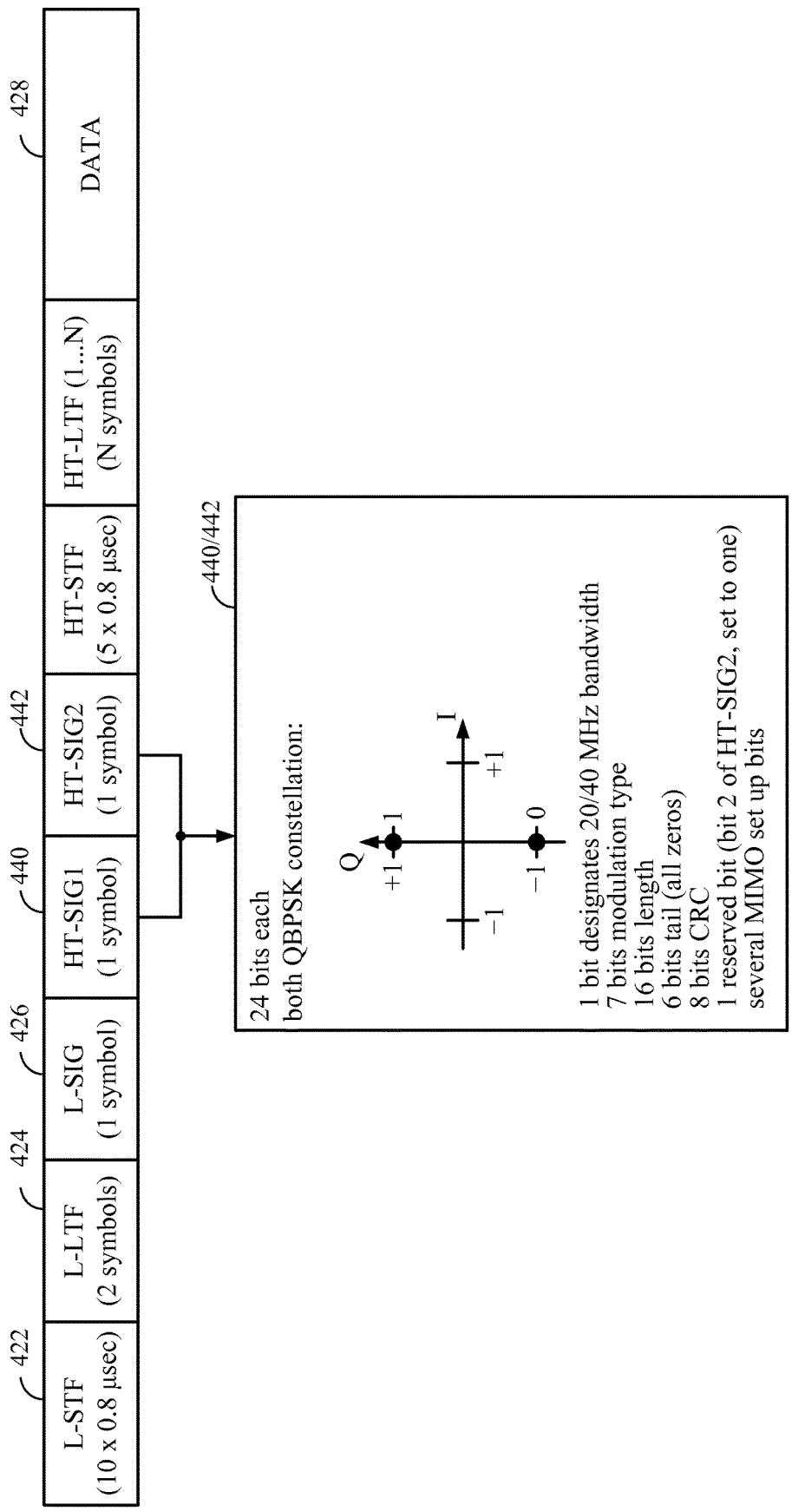

FIGS. 4 and 5 illustrate data packet formats for several currently existing IEEE 802.11 standards. Turning first to FIG. 4, a packet format for IEEE 802.11a, 11b, and 11g is illustrated. This frame includes a short training field 422, a long training field 424, and a signal field 426. The training fields do not transmit data, but they allow synchronization between the AP and the receiving STAs for decoding the data in the data field 428.

The signal field 426 delivers information from the AP to the STAs about the nature of the packet being delivered. In IEEE 802.11a/b/g devices, this signal field has a length of 24 bits, and is transmitted as a single OFDM symbol at a 6 Mb/s rate using binary phase shift keying (BPSK) modulation and a code rate of ½. The information in the signal (SIG) field 426 includes 4 bits describing the modulation scheme of the data in the packet (e.g., BPSK, 16QAM, 64QAM, etc.), and 12 bits for the packet length. This information is used by a STA to decode the data in the packet when the packet is intended for the STA. When a packet is not intended for a particular STA, the STA can defer any communication attempts during the time period defined in the length field of the SIG symbol 426, and can, to save power, enter a sleep mode during the packet period of up to about 5.5 msec.

As features have been added to IEEE 802.11, changes to the format of the SIG fields in data packets were developed to provide additional information to STAs. FIG. 5 shows the packet structure for the IEEE 802.11n packet. The 11n addition to the IEEE.802.11 standard added MIMO functionality to IEEE.802.11 compatible devices. To provide backward compatibility for systems containing both IEEE 802.11a/b/g devices and IEEE 802.11n devices, the data packet for IEEE 802.11n systems also includes the STF, LTF, and SIG fields of these earlier systems, noted as L-STF 422, L-LTF 424, and L-SIG 426 with a prefix L to denote that they are "legacy" fields. To provide the needed information to STAs in an IEEE 802.11n environment, two additional signal symbols 440 and 442 were added to the IEEE 802.11n data packet. In contrast with the SIG field and L-SIG field 426, however, these signal fields used rotated BPSK modulation (also referred to as QBPSK modulation). When a legacy device configured to operate with IEEE 802.11a/b/g receives such a packet, it can receive and decode the L-SIG field 426 as a normal 11/b/g packet. However, as the device continued decoding additional bits, they may not be decoded successfully because the format of the data packet after the L-SIG field 426 is different from the format of an 11/b/g packet, and the CRC check performed by the device during this process can fail. This causes these legacy devices to stop processing the packet, but still defer any further operations until a time period has passed defined by the length field in the initially decoded L-SIG. In contrast, new devices compatible with IEEE 802.11n would sense the rotated modulation in the HT-SIG fields, and process the packet as an 802.11n packet. Furthermore, an 11n device can tell that a packet is intended for an 11/b/g device because if it senses any modulation other than QBPSK in the symbol following the L-SIG 426, it can ignore it as an 11/b/g packet. After the HT-SIG1 and SIG2 symbols, additional training fields suitable for MIMO communication are provided, followed by the data 428.

Figure 6:
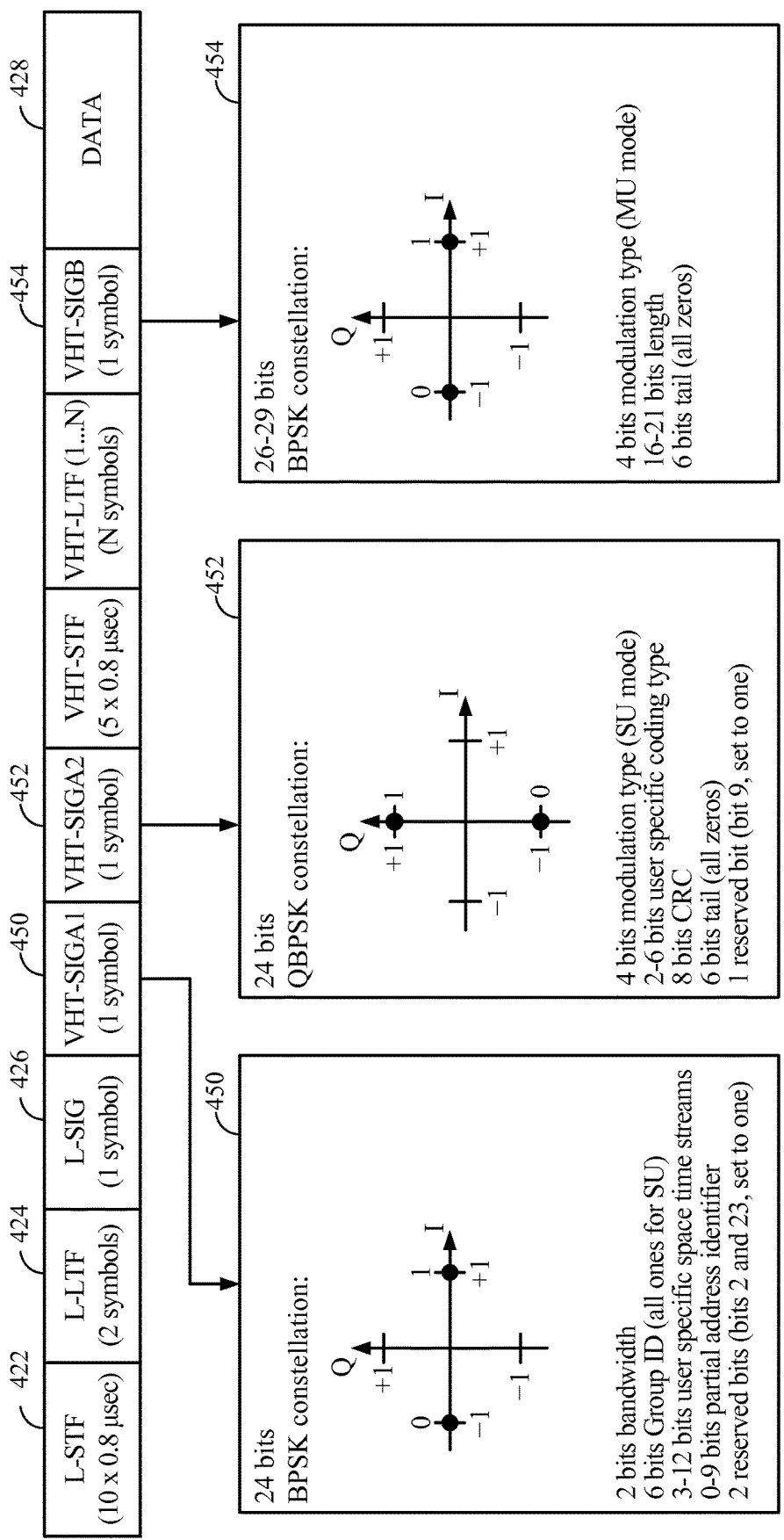
FIG. 6 illustrates a frame format for the currently existing IEEE 802.11ac standard.

FIG. 6 illustrates a frame format for the currently existing IEEE 802.11ac standard, which added multi-user MIMO functionality to the IEEE 802.11 family. Similar to IEEE 802.11n, an 802.11ac frame contains the same legacy short training field (L-STF) 422 and long training field (L-LTF) 424. An 802.11ac frame also contains a legacy signal field L-SIG 426 as described above.

Next, an 802.11ac frame includes a Very High Throughput Signal (VHT-SIG-A1 450 and A2 452) field two symbols in length. This signal field provides additional configuration information related to 11ac features that are not present in 11/b/g and 11n devices. The first OFDM symbol 450 of the VHT-SIG-A can be modulated using BPSK, so that any 802.11n device listening to the packet can believe the packet to be an 802.11a packet, and can defer to the packet for the duration of the packet length as defined in the length field of the L-SIG 426. Devices configured according to 11/g can be expecting a service field and media access control (MAC) header following the L-SIG 426 field. When they attempt to decode this, a CRC failure can occur in a manner similar to the procedure when an 11n packet is received by an 11a/b/g device, and the 11/b/g devices can also defer for the period defined in the L-SIG field 426. The second symbol 452 of the VHT-SIG-A is modulated with a 90-degree rotated BPSK. This rotated second symbol allows an 802.11ac device to identify the packet as an 802.11ac packet. The VHT-SIGA1 450 and A2 452 fields contain information on a bandwidth mode, modulation and coding scheme (MCS) for the single user case, number of space time streams (NSTS), and other information. The VHT-SIGA1 450 and A2 452 can also contain a number of reserved bits that are set to "1." The legacy fields and the VHT-SIGA1 and A2 fields can be duplicated over each 20 MHz of the available bandwidth. Although duplication may be constructed to mean making or being an exact copy, certain differences may exist when fields, etc. are duplicated as described herein.

After the VHT-SIG-A, an 802.11ac packet can contain a VHT-STF, which is configured to improve automatic gain control estimation in a multiple-input and multiple-output (MIMO) transmission. The next 1 to 8 fields of an 802.11ac packet can be VHT-LTFs. These can be used for estimating the MIMO channel and then equalizing the received signal. The number of VHT-LTFs sent can be greater than or equal to the number of spatial streams per user. Finally, the last field in the preamble before the data field is the VHT-SIG-B 454. This field is BPSK modulated, and provides information on the length of the useful data in the packet and, in the case of a multiple user (MU) MIMO packet, provides the MCS. In a single user (SU) case, this MCS information is instead contained in the VHT-SIGA2. Following the VHT-SIG-B, the data symbols are transmitted Although 802.11ac introduced a variety of new features to the 802.11 family, and included a data packet with preamble design that was backward compatible with 11/g/n devices and also provided information necessary for implementing the new features of 11ac, configuration information for OFDMA tone allocation for multiple access is not provided by the 11ac data packet design. New preamble configurations are desired to implement such features in any future version of IEEE 802.11 or any other wireless network protocol using OFDM subcarriers.

Figure 7:
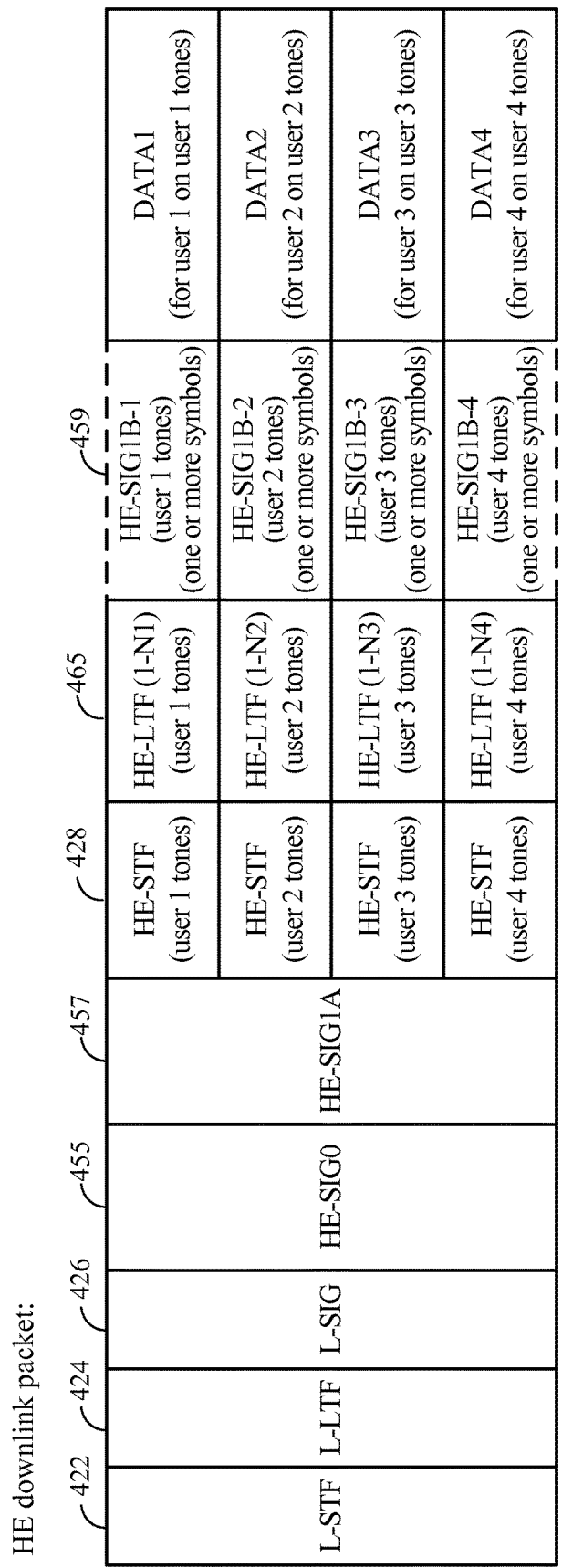
FIG. 7 illustrates an exemplary structure of a physical-layer packet which can be used to enable backward-compatible multiple access wireless communications.

FIG. 7 illustrates an exemplary structure of a physical-layer packet which can be used to enable backward-compatible multiple access wireless communications. In this example physical-layer packet, a legacy preamble including the L-STF 422, L-LTF 426, and L-SIG 426 are included. In various embodiments, each of the L-STF 422, L-LTF 426, and L-SIG 426 can be transmitted using 20 MHz, and multiple copies can be transmitted for each 20 MHz of spectrum that the AP 104 (FIG. 1) uses. A person having ordinary skill in the art can appreciate that the illustrated physical-layer packet can include additional fields, fields can be rearranged, removed, and/or resized, and the contents of the fields varied. This packet also contains an HE-SIG0 symbol 455, and one or more HE-SIG1A symbols 457 (which can be variable in length), and an optional HE-SIG1B symbol 459 (which can be analogous to the VHT-SIG1B field 454 of FIG. 4). In various embodiments, the structure of these fields can be backward compatible with IEEE 802.11a/b/g/n/ac devices, and can also signal OFDMA HE devices that the packet is an HE packet. To be backward compatible with IEEE 802.11a/b/g/n/ac devices, appropriate modulation can be used on each of these symbols. In some implementations, the HE-SIG0 field 455 can be modulated with BPSK modulation. This can have the same effect on 802.11a/b/g/n devices as is currently the case with 802.11ac packets that also have their first SIG symbol BPSK modulated. For these devices, it does not matter what the modulation is on the subsequent HE-SIG symbols 457. In various embodiments, the HE-SIG0 field 455 can be modulated and repeated across multiple channels.

In various embodiments, the HE-SIG1A field 457 can be BPSK or QBPSK modulated. If BPSK modulated, an 11ac device can assume the packet is an 802.11a/b/g packet, and can stop processing the packet, and can defer for the time defined by the length field of L-SIG 426. If QBPSK modulated, an 802.11ac device can produce a CRC error during preamble processing, and can also stop processing the packet, and can defer for the time defined by the length field of L-SIG. To signal HE devices that this is an HE packet, at least the first symbol of HE-SIG1A 457 can be QBPSK modulated.

The information necessary to establish an OFDMA multiple access communication can be placed in the HE-SIG fields 455, 457, and 459 in a variety of positions. In various embodiments, the HE-SIG0 455 can include one or more of: a duration indication, a bandwidth indication (which can be, for example, 2 bits), a BSS color ID (which can be, for example, 3 bits), an UL/DL indication (which can be, for example, a 1-bit flag), a cyclic redundancy check (CRC) (which can be, for example, 4 bits), and a clear channel assessment (CCA) indication (which can be, for example, 2 bits).

In various embodiments, the HE-SIG1 field 457 can include a tone allocation information for OFDMA operation. The example of FIG. 7 can allow four different users to be each assigned a specific sub-band of tones and a specific number of MIMO space time streams. In various embodiments, 12 bits of space time stream information allows three bits for each of four users such that 1-8 streams can be assigned to each one. 16 bits of modulation type data allows four bits for each of four users, allowing assignment of any one of 16 different modulation schemes (16QAM, 64QAM, etc.) to each of four users. 12 bits of tone allocation data allows specific sub-bands to be assigned to each of four users.

One example SIG field scheme for sub-band (also referred to herein as sub-channel) allocation includes a 6-bit Group ID field as well as 10 bits of information to allocate sub-band tones to each of four users. The bandwidth used to deliver a packet can be allocated to STAs in multiples of some number of MHz. For example, the bandwidth can be allocated to STAs in multiples of B MHz. The value of B can be a value such as 1, 2, 5, 10, 15, or 20 MHz. The values of B can be provided by a two bit allocation granularity field. For example, the HE-SIG1A 457 can contain one two-bit field, which allows for four possible values of B. For example, the values of B can be 5, 10, 15, or 20 MHz, corresponding to values of 0-3 in the allocation granularity field. In some aspects, a field of k bits can be used to signal the value of B, defining a number from 0 to N, where 0 represents the least flexible option (largest granularity), and a high value of N represents the most flexible option (smallest granularity). Each B MHz portion can be referred to as a sub-band.

The HE-SIG1A 457 can further use 2 bits per user to indicate the number of sub-bands allocated to each STA. This can allow 0-3 sub-bands to be allocated to each user. The group-id (G_ID) can be used in order to identify the STAs, which can receive data in an OFDMA packet. This 6-bit G_ID can identify up to four STAs, in a particular order, in this example.

The training fields and data which are sent after the HE-SIG symbols can be delivered by the AP according to the allocated tones to each STA. This information can potentially be beamformed. Beamforming this information can have certain advantages, such as allowing for more accurate decoding and/or providing more range than non-beamformed transmissions.

Depending on the space time streams assigned to each user, different users can use a different number of HE-LTFs 465. Each STA can use a number of HE-LTFs 465 that allows channel estimation for each spatial stream associated with that STA, which can be generally equal to or more than the number of spatial streams. LTFs can also be used for frequency offset estimation and time synchronization. Because different STAs can receive a different number of HE-LTFs, symbols can be transmitted from the AP 104 (FIG. 1) that contain HE-LTF information on some tones and data on other tones.

In some aspects, sending both HE-LTF information and data on the same OFDM symbol can be problematic. For example, this can increase the peak-to-average power ratio (PAPR) to too high a level. Thus, it can be beneficial to instead to transmit HE-LTFs 465 on all tones of the transmitted symbols until each STA has received at least the required number of HE-LTFs 465. For example, each STA can need to receive one HE-LTF 465 per spatial stream associated with the STA. Thus, the AP can be configured to transmit a number of HE-LTFs 465 to each STA equal to the largest number of spatial streams assigned to any STA. For example, if three STAs are assigned a single spatial stream, but the fourth STA is assigned three spatial streams, in this aspect, the AP can be configured to transmit four symbols of HE-LTF information to each of the four STAs before transmitting symbols containing payload data.

It is not necessary that the tones assigned to any given STA be adjacent. For example, in some implementations, the sub-bands of the different receiving STAs can be interleaved. For example, if each of user-1 and user-2 receive three sub-bands, while user-4 receives two sub-bands, these sub-bands can be interleaved across the entire AP bandwidth. For example, these sub-bands can be interleaved in an order such as 1,2,4,1,2,4,1,2. In some aspects, other methods of interleaving the sub-bands can also be used. In some aspects, interleaving the sub-bands can reduce the negative effects of interferences or the effect of poor reception from a particular device on a particular sub-band. In some aspects, the AP can transmit to STAs on the sub-bands that the STA prefers. For example, certain STAs can have better reception in some sub-bands than in others. The AP can thus transmit to the STAs based at least in part on which sub-bands the STA can have better reception. In some aspects, the sub-bands can also not be interleaved. For example, the sub-bands can instead be transmitted as 1,1,1,2,2,2,4,4. In some aspects, it can be pre-defined whether or not the sub-bands are interleaved.

In the example of FIG. 7, HE-SIG0 455 symbol modulation can be used to signal HE devices that the packet is an HE packet. Other methods of signaling HE devices that the packet is an HE packet can also be used. In the example of FIG. 7, the L-SIG 426 can contain information that instructs HE devices that an HE preamble can follow the legacy preamble. For example, the L-SIG 426 can contain a low-energy, 1-bit code on the Q-rail which indicates the presence of a subsequent HE preamble to HE devices sensitive to the Q signal during the L-SIG 426. A very low amplitude Q signal can be used because the single bit signal can be spread across all the tones used by the AP to transmit the packet. This code can be used by high efficiency devices to detect the presence of an HE-preamble/packet. The L-SIG 426 detection sensitivity of legacy devices need not be significantly impacted by this low-energy code on the Q-rail. Thus, these devices can be able to read the L-SIG 426, and not notice the presence of the code, while HE devices can be able to detect the presence of the code. In this implementation, all of the HE-SIG fields can be BPSK modulated if desired, and any of the techniques described herein related to legacy compatibility can be used in conjunction with this L-SIG signaling.

In various embodiments, any HE-SIG field 455-459 can contain bits defining user-specific modulation type for each multiplexed user. For example, the optional HE-SIG1B 459 field can contain bits defining user-specific modulation type for each multiplexed user.

In some aspects, wireless signals can be transmitted in a low-rate (LR) mode, for example according the 802.11ax protocol. Particularly, in some embodiments, the AP 104 can have a greater transmit power capability compared to the STAs 106. In some embodiments, for example, the STAs 106 can transmit at several dB lower than the AP 104. Thus, DL communications from the AP 104 to the STAs 106 can have a higher range than UL communications from the STAs 106 to the AP 104. In order to close the link budget, the LR mode can be used. In some embodiments, the LR mode can be used in both DL and UL communications. In other embodiments, the LR mode is only used for UL communications.

In some embodiments, the HEW STAs 106 can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 4 ms and a 4× symbol duration can be 16 ms. Thus, in various embodiments, 1× symbols can be referred to herein as legacy symbols and 4× symbols can be referred to as HEW symbols. In other embodiments, different durations are possible.

Figure 8:
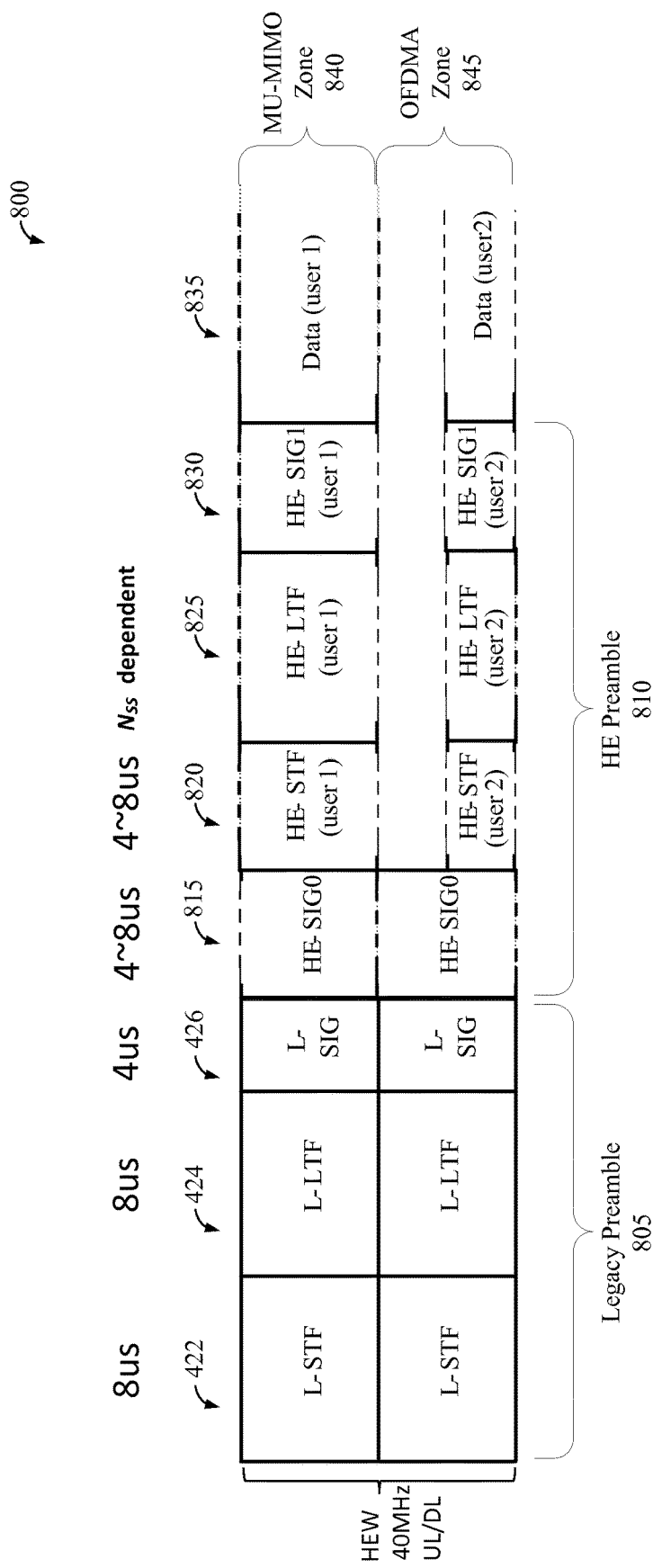
FIG. 8 illustrates an exemplary structure of an uplink or downlink physical-layer packet which can be used to enable wireless communications.

FIG. 8 illustrates an exemplary structure of an uplink or downlink physical-layer packet 800 which can be used to enable wireless communications. In the illustrated embodiment, the physical-layer packet 800 includes a legacy preamble 805 including the L-STF 422, L-LTF 426, and L-SIG 426, an HE preamble 810 including an HE-SIG0 815, an HE-STF 820, an HE-LTF 825, and an HE-SIG1 830, and a payload 835. A person having ordinary skill in the art will appreciate that the illustrated physical-layer packet 800 can include additional fields, fields can be rearranged, removed, and/or resized, and the contents of the fields varied.

Certain aspects of the present disclosure support mixing MU-MIMO and OFDMA techniques in the frequency domain in a same PPDU. In some embodiments, a first portion of the PPDU bandwidth can be transmitted as a one of at least a MU-MIMO transmission and an OFDMA transmission. A second portion of the PPDU bandwidth can be transmitted as one of at least a MU-MIMO transmission and an OFDMA transmission. In various embodiments, each portion can be referred to as a "zone." Thus, in various embodiments, the first and second portions can include any combination such as MU-MIMO/OFDMA, MU-MIMO/MU-MIMO, OFDMA/OFDMA, and OFDMA/OFDMA.

In some embodiments, the PPDU bandwidth can include more than two portions or zones. In some embodiments, the PPDU bandwidth can be limited to a single zone or a maximum of two zones. For example, FIG. 8 shows a two-zone configuration including a MU-MIMO zone 840 and an OFDMA zone 845. In these embodiments, MU-MIMO or OFDMA transmissions can be sent simultaneously from an AP to multiple STAs and can create efficiencies in wireless communication. Although the two zones 840 and 845 are shown in FIG. 8, a person having ordinary skill in the art will appreciate that other combinations are possible within the scope of this disclosure.

In various embodiments, each of the L-STF 422, L-LTF 426, and L-SIG 426 can be transmitted using 20 MHz, and multiple copies can be transmitted for each 20 MHz of spectrum that the AP 104 (FIG. 1) uses. Any combination of the HE-SIG0 815, the HE-STF 820, the HE-LTF 825, the HE-SIG1 830, and the payload 835 can be transmitted for each of one or more OFDMA users. In the illustrated embodiment, two users 1-2 share the illustrated 40 MHz bandwidth, and a portion of the 40 MHz bandwidth is not assigned to any users. An one embodiment, user 1 can correspond to the STA 106A (FIG. 1) and user 2 can correspond to the STA 106B (FIG. 1).

Although the packet 800 is referred to herein as a single packet, in various embodiments the transmissions associated with each zone, or alternatively with each user, can be referred to as a separate packet. Although the packet 800 can be used for UL and DL transmissions, UL transmissions will be discussed in greater detail herein. A person having ordinary skill in the art will appreciate that discussion related to UL transmissions from the STAs 106 to the AP 104 can also be applied to DL transmissions from the AP 104 to the STAs 106.

In the illustrated embodiment, the packet 800 uses a 1× symbol duration. In other embodiments, the 4× symbol duration can be used for at least a portion of the packet 800 such as, for example, any portion of the HE preamble 810 and/or the payload 835. In the illustrated embodiment, the L-STF 422 is 8 µs (i.e., two 1× symbols) long, the L-LTF 424 is 8 µs (i.e., two 1× symbols) long, the L-SIG 426 is 4 µs (i.e., one 1× symbol) long, the HE-SIG0 815 is from 4 µs (i.e., one 1× symbol) long to 8 µs (i.e., two 1× symbols) long, the HE-STF 820 is from 4 µs (i.e., one 1× symbol) long to 8 µs (i.e., two 1× symbols) long, and the HE-LTF 825 is a variable length, which can be dependent on the number of spatial streams (NSS) used for transmission of the payload 835.

Duplication of Legacy Preamble

In one embodiment, the packet 800 is an UL packet. In one UL embodiment, STAs can be configured to transmit the legacy preamble 805 an entire channel to which it is assigned. For example, the STA user 1 can transmit the legacy preamble 805 over the upper 20 MHz channel shown in FIG. 8, even in embodiments where the STA user 1 is not assigned the entire 20 MHz channel. Similarly, the STA user 2 can transmit the legacy preamble 805 over the lower 20 MHz channel shown in FIG. 8, even in embodiments where the STA user 2 is not assigned the entire 20 MHz channel. Such embodiments can advantageously simplify transmission by decreasing the bandwidth of transmission.

In one embodiment, the STAs can be configured to transmit the legacy preamble 805 over an entire zone to which it is assigned. For example, the STA user 1 can transmit the legacy preamble 805 over the entire MU-MIMO zone 840. Similarly, the STA user 2 can transmit the legacy preamble 805 over the entire OFDMA zone 845, even though it is not assigned the entire zone.

In one embodiment, STAs can be configured to transmit the legacy preamble 805 over an entire bandwidth available, including bandwidth to which the STA user 1 is not assigned. For example, the STA user 1 can transmit the legacy preamble 805 over the entire illustrated 40 MHz bandwidth, including both the MU-MIMO zone 840 and the OFDMA zone 845. Similarly, the STA user 2 can transmit the legacy preamble 805 over the entire illustrated 40 MHz bandwidth, including both the MU-MIMO zone 840 and the OFDMA zone 845.

In one embodiment, STAs can be configured to transmit the legacy preamble 805 over an entire channel to which it is assigned, plus a primary channel when the STA is not assigned a primary channel. For example, assume that the upper 20 MHz channel illustrated in FIG. 8 is a primary channel. The STA user 1 can transmit the legacy preamble 805 over upper 20 MHz channel shown in FIG. 8, even in embodiments where the STA user 1 is not assigned the entire 20 MHz channel. On the other hand, because the STA user 2 is not assigned to the primary channel, the STA user 2 can transmit the legacy preamble 805 over the entire illustrated 40 MHz bandwidth, including both the MU-MIMO zone 840 and the OFDMA zone 845. Such embodiments can advantageously ensure that the legacy preamble 805 is transmitted over the entire available bandwidth, even when no STA is assigned to the primary channel.

In an embodiment, transmission of data "over" a certain channel or bandwidth includes duplicating the data in a plurality of sub-channels that compose the channel or bandwidth. For example, the STA user 1 can separately modulate the legacy preamble 805 in both the upper and lower 20 MHz sub-bands of the illustrated 40 MHz bandwidth. In another embodiment, transmission of data "over" a certain channel or bandwidth includes combined modulation of the data with respect to the channel or bandwidth. For example, the STA user 2 can treat the entire illustrated 40 MHz bandwidth as a single OFDMA channel.

L-SIG Length Field

In some embodiments, different users can have different frame lengths. For example, the STA user 1 can have more data 835 than the STA user 2, or the HE-LTF 825 for the STA user 1 can be longer than the HE-LTF 825 for the STA user 2 (for example, where user 1 is assigned more spatial streams than user 2).

In one embodiment, the L-SIG 426 for the STA user 1 can be different from the L-SIG 426 for the STA user 2, where the frame length for user 1 is different from the frame length for user 2. For example, the L-SIGs 426 can include a length field indicating a different frame length for the STA user 1 and the STA user 2.

In one embodiment, the L-SIG 426 can be the same for each zone, even where the frame length is different for users within a zone. For example, the L-SIG 426 for each zone can include a length field set to the maximum of frame lengths for each user in the zone. The SIG 426 can be different between zones where the frame length is different between zones. For example, the L-SIGs 426 can include a length field indicating a different frame length for the MU-MIMO zone 840 than for the OFDMA zone 845.

In one embodiment, the L-SIGs 426 can be the same across all users and zones, even where the frame length is different between users. For example, the L-SIG 426 can include a length field set to the maximum of frame lengths for each user. Such embodiments can advantageously increase transmission power for the legacy preamble 805. In some embodiments, one or more fields are padded to the value of the length field. For example, the payload 835 for the STA user 1 can smaller than the payload 835 for the STA user 2, and can be padded out match the payload 835 for the STA user 2.

HE-SIG0 Field

In one embodiment, the packet 800 can omit the HE-SIG0 fields 915, thereby reducing overhead. In another embodiment, the packet 800 includes the HE-SIG0 fields 815. Including the HE-SIG0 fields 820 can advantageously convey additional information (such as, for example, a DL/UL mode, SU/UL mode, MU-OFDMA mode, BSS color ID, etc.) for example to bystander devices to which the packet is not addressed. FIGS. 9A-9E show various exemplary packet configurations including the HE-SIG0 815 of 8.

In various embodiments, the HE-SIG0 fields 815 can include a full or partial BSS color ID. In some embodiments, the partial BSSID can include a hash of the AP 104 BSSID MAC address, or another number uniquely or pseudo-uniquely associated with the AP 104. The partial BSSID can be used, for example, for controlling reuse in dense networks. Accordingly, STAs associated with the partial BSSID can defer at the packet detection (PD) level to avoid intra-BSS hidden nodes. Overlapping basic service set (OBSS) STAs can defer at the energy detection (ED) level, thereby improving reuse. Moreover, the partial BSSID can enable interference source identification, which in some embodiments can enable TXOP reuse. Additionally, STAs can enter power-save modes based on the partial BSSID, in some embodiments in combination with a receiver association ID (AID) and/or a UL/DL indication.

In various embodiments, the HE-SIG0 fields 815 can include a full or partial receiver AID. For example, the partial receiver AID can include a truncated or hashed version of the receiver AID. STAs 106 can use the full or partial receiver AID in order to enter a power save mode when determining that a packet is not addressed to the STA 106. Moreover, the STAs 106 can use the full or partial receiver AID for TXOP reuse in some embodiments.

In various embodiments, the HE-SIG0 fields 815 can include a full or partial transmitter AID. For example, the partial transmitter AID can include a truncated or hashed version of transmitter receiver AID. STAs 106 can use the full or partial transmitter AID in order to obtain interference source identification. Moreover, the STAs 106 can use the full or partial transmitter AID for TXOP reuse in some embodiments.

In various embodiments, the HE-SIG0 fields 815 can include a UL/DL indication. In some embodiments, the UL/DL indication can be implicit in an AID (transmitter or receiver) indication on the HE-SIG0 fields 815. For example, when the full or partial transmitter AID is included in the HE-SIG0 fields 815, UL can be indicated. When the full or partial receiver AID is included in the HE-SIG0 fields 815, DL can be indicated (or vice versa in some embodiments). STAs 106 can use the UL/DL indication in order to enter a power save mode when determining that a packet is not addressed to the STA 106 (or expected from the STA 106). Moreover, the STAs 106 can use the UL/DL indication for interference source identification in UL/DL scheduling.

In various embodiments, the HE-SIG0 fields 815 can include an immediate response presence/duration indication. In some embodiments, the immediate response presence/duration indication can indicate a deferral time such as, for example, an extended interframe space (EIFS) or a response indication deferral (RID). For example, the immediate response presence/duration indication can include a flag indicating whether or not a response is requested. When a response is indicated, a standard deferral time can be applied. In other embodiments, the immediate response presence/duration indication can be two or more bits long. In such embodiments, the immediate response presence/duration indication can identify a specific deferral duration, which can map to the bit value. In some embodiments, minimum deferral duration can be a short interframe space (SIFS), plus a minimum header duration.

In various embodiments, the HE-SIG0 fields 815 can include a transmit power indication. For example, the transmit power indication can include one or more bits mapping to one or more transmit powers. A receiving STA can apply the transmit power indication for transmit opportunity (TXOP) reuse and/or for advanced adaptive CCA rules.

In some embodiments, the HE-SIG0 fields 815 can include synchronization information. For example, the HE-SIG0 fields 815 can indicate a full or partial time synchronization function (TSF) to establish a synchronization point. In some embodiments, the partial TSF can include a hashed or truncated TSF.

In some embodiments, the HE-SIG0 fields 815 can include a TXOP bandwidth (BW) and/or primary channel offset indication. In some embodiments, the STAs 106 can use the TXOP BW indication for TXOP reuse. For example, a third-party receiver can determine whether or not to transmit in a free secondary channel by identifying utilized channels in a TXOP based on t the TXOP BW and/or primary channel offset.

FIG. 9A illustrates an exemplary structure of an uplink physical-layer packet 900A which can be used to enable wireless communications. In the illustrated embodiment, the physical-layer packet 900A includes the L-STF 422, L-LTF 426, the L-SIG 426, a repeated L-SIG (RL-SIG) 910, the HE-SIG0 815, the HE-STF 820, the HE-LTF 825, the HE-SIG1 830, and the payload 835. A person having ordinary skill in the art will appreciate that the illustrated physical-layer packet 800 can include additional fields, fields can be rearranged, removed, and/or resized, and the contents of the fields varied.

In the illustrated embodiment, the RL-SIG 910 includes total or partial repetition of the L-SIG 426. For example, in an embodiment, the RL-SIG 910 can include a repetition of even tones of the L-SIG 426. In an embodiment, the RL-SIG 910 can include a repetition of odd tones of the L-SIG 426. In an embodiment, the RL-SIG 910 can include a repetition of every X tones of the L-SIG 426, where X is the ratio of symbol duration for the L-SIG 426 to symbol duration for the RL-SIG 910. In an embodiment, the HE-SIG0 815 is 4 μs, plus a guard interval (GI).

In various embodiments, the STA 106 can encode HE-SIG information in a polarity of repeated symbols. For example, to encode a 1, the STA 106 can multiply the repeated bits in the L-SIG 426 by −1, to encode a 0, the STA 106 can multiply the repeated bits in the L-SIG 426 by 1, and so on. In various embodiments, positive and negative polarities can represent 0 and 1, respectively. In other embodiments, different encodings are possible. Note that information bit [0, 1] become modulation bit [1, −1] in one embodiment. Changing the polarity of a symbol means multiply it with +−1 instead of [0, 1].

FIG. 9B illustrates another exemplary structure of an uplink physical-layer packet 900B which can be used to enable wireless communications. In the illustrated embodiment, the physical-layer packet 900B includes the L-STF 422, L-LTF 426, the L-SIG 426, the HE-SIG0 815, a repeated HE-SIG0 (RHE-SIG0) 915, an HE-SIG0B 920, the HE-STF 820, the HE-LTF 825, the HE-SIG1 830, and the payload 835. A person having ordinary skill in the art will appreciate that the illustrated physical-layer packet 800 can include additional fields, fields can be rearranged, removed, and/or resized, and the contents of the fields varied. For example, the HE-SIG0B 920 can be omitted in some embodiments.

In the illustrated embodiment, the RHE-SIG0 915 includes total or partial repetition of the HE-SIG0 815. For example, in an embodiment, the RHE-SIG0 915 can include a repetition of even tones of the HE-SIG0 815. In an embodiment, the RHE-SIG0 915 can include a repetition of odd tones of the HE-SIG0 815. In an embodiment, the RHE-SIG0 915 can include a repetition of every X tones of the HE-SIG0 815, where X is the ratio of symbol duration for the HE-SIG0 815 to symbol duration for the RHE-SIG0 915. In an embodiment, the HE-SIG0B 920 is 4 μs, plus a guard interval (GI).

In various embodiments, the STA 106 can encode HE-SIG information in a polarity of repeated symbols. For example, to encode a 1, the STA 106 can multiply the repeated bits in the HE-SIG0 815 by −1, to encode a 0, the STA 106 can multiply the repeated bits in the HE-SIG0 815 by 1, and so on. In various embodiments, positive and negative repetition polarities can represent 0 and 1, respectively. In other embodiments, different encodings are possible. Note that information bit [0, 1] become modulation bit [1, −1] in one embodiment. Changing the polarity of a symbol means multiply it with +−1 instead of [0, 1].

FIG. 9C illustrates another exemplary structure of an uplink physical-layer packet 900C which can be used to enable wireless communications. In the illustrated embodiment, the physical-layer packet 900C includes the L-STF 422, L-LTF 426, the L-SIG 426, the HE-SIG0 815, the HE-STF 820, the HE-LTF 825, the HE-SIG1 830, and the payload 835. A person having ordinary skill in the art will appreciate that the illustrated physical-layer packet 800 can include additional fields, fields can be rearranged, removed, and/or resized, and the contents of the fields varied. In the illustrated embodiment, the HE-SIG0 815 is 4 µs long.

Figure 9D:
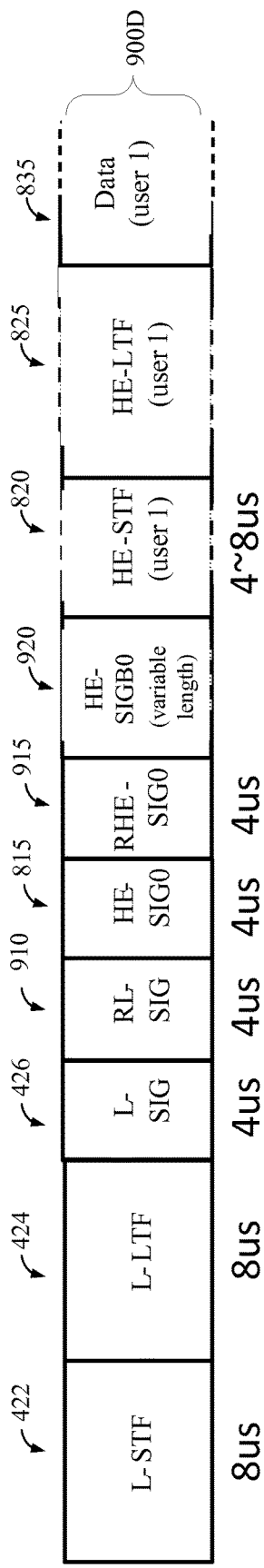
FIG. 9D illustrates another exemplary structure of an uplink physical-layer packet which can be used to enable wireless communications.

FIG. 9D illustrates another exemplary structure of an uplink physical-layer packet 900D which can be used to enable wireless communications. In the illustrated embodiment, the physical-layer packet 900D includes L-STF 422, L-LTF 424, L-SIG 426, RL-SIG 910, HE-SIG0 815, a repeated HE-SIG0 (RHE-SIG0) 915, HE-SIG0B 920, HE-STF 820, HE-LTF 825, and payload 835. A person having ordinary skill in the art will appreciate that the illustrated physical-layer packet 900D can include additional fields, fields can be rearranged, removed, and/or resized, and the contents of the fields varied. For example, HE-SIG0B 920 or HE-STF 820 can be different lengths in various embodiments.

In the illustrated embodiment, RHE-SIG0 915 includes a total or partial repetition of HE-SIG0 815. As described above with respect to FIG. 9B, RHE-SIG0 915 can include a repetition of even or odd tones, or of every X tones. In various embodiments, RHE-SIG0 915 is 4 µs. The use of RHE-SIG0 915 may provide for a better protected or a more robust packet 900D, but may also provide additional overhead in wireless communications. Whether or not RHE-SIG0 915 is present in the packet 900D may depend on a variety of factors. For example, the presence of RHE-SIG0 915 may depend on at least one of the following: the modulation and coding scheme of HE-SIGB0 920; whether HE-SIGB0 920 comprises a long GI; whether HE-SIGB0 920 comprises a short GI; whether HE-LFT 825 is uncompressed; whether HE-LFT 825 is compressed; the compression factor of HE-LFT 825; whether the payload 835 comprises a CP; and the length of a CP of the payload 835.

HE-SIGB0 920 may comprise a cyclic prefix (CP) or guard interval (GI). The presence of a CP or GI may provide for a better protected or a more robust packet 900D, but may also provide additional overhead in wireless communications. HE-SIGB0 920 may vary in length for these reasons, and in some embodiments HE-SIGB0 920 may be five or six symbols in length. In some embodiments, HE-SIGB0 920 comprises a short GI. In other embodiments, HE-SIGB0 920 comprises a long GI. The modulation and coding scheme (MCS) used with HE-SIGB0 920 may also vary. Which MCS is used may be based upon the presence or the length of the GI of HE-SIGB0 920. In some exemplary embodiments, MCS0 is utilized. In other exemplary embodiments, MCS10 is utilized.

HE-LFT 825 may be compressed or uncompressed. An uncompressed HE-LFT 825 may provide for a better protected or a more robust packet 900D, but may also provide additional overhead in wireless communications. Accordingly, in some embodiments, HE-LFT 825 is uncompressed. In other embodiments, HE-LFT 825 is compressed. In some of these embodiments, HE-LFT 825 is compressed by a factor of two. In these embodiment, the compressed HE-LFT 825 may provide less protection of the HE-LFT 825 or the packet 900D, and therefore RHE-SIG0 915 may be present in the packet 900D.

The payload 835 may comprise a cyclic prefix (CP) or guard interval (GI). A longer CP of the payload 835 may provide for a better protected or a more robust packet 900D, but may also provide additional overhead in wireless communications. Accordingly, in some embodiments, a longer CP is used. In other embodiments, a shorter CP is used. By way of example only, CP may be 0.8 µs, 1.6 µs, or 3.2 µs. In one exemplary embodiment, packet 900D comprises the RHE-SIG0 915, HE-SIG0B 920 utilizes MCS10, and HE-LFT 825 is uncompressed.

Figure 9E:
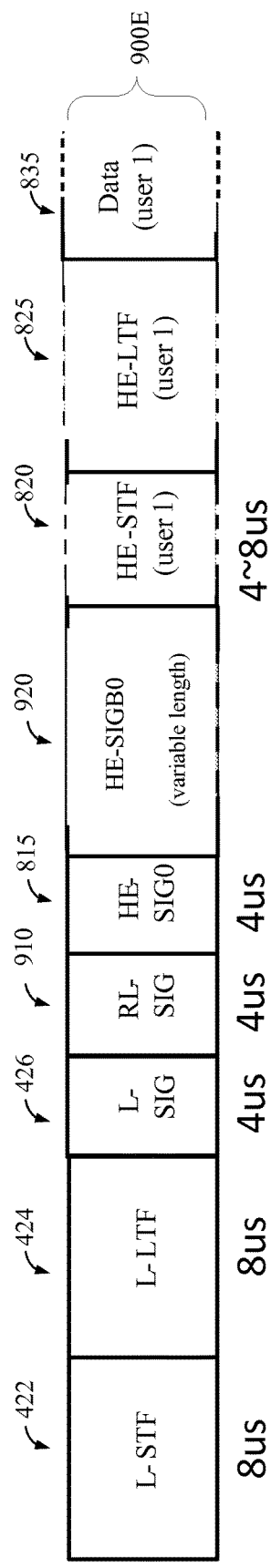
FIG. 9E illustrates another exemplary structure of an uplink physical-layer packet which can be used to enable wireless communications.

FIG. 9E illustrates another exemplary structure of an uplink physical-layer packet 900E which can be used to enable wireless communications. In the illustrated embodiment, the physical-layer packet 900D includes L-STF 422, L-LTF 424, L-SIG 426, RL-SIG 910, HE-SIG0 815, HE-SIG0B 920, HE-STF 820, HE-LTF 825, and payload 835. A person having ordinary skill in the art will appreciate that the illustrated physical-layer packet 900D can include additional fields, fields can be rearranged, removed, and/or resized, and the contents of the fields varied. For example, HE-SIG0B 920 or HE-STF 820 can be different lengths in various embodiments.

HE-STF Field

Referring back to FIG. 8, in one embodiment, the packet 800 can omit the HE-STF fields 820, thereby reducing overhead. In another embodiment, the packet 800 includes the HE-STF fields 820. Including the HE-STF fields 820 can advantageously convey additional information (such as, for example, automatic gain control).

HE-LTF Alignment

As discussed above, in some embodiments, the HE-LTF fields 825 can vary in length between users, for example due to different number of spatial streams. In the illustrated embodiment of FIG. 8, the HE-LTF fields 825 are the same size. In various embodiments, the HE-LTF fields 825 can be different sizes.

In one embodiment, the HE-LTF fields 825 can be set to the same size by padding to the longest of the HE-LTF fields 825 across the entire available bandwidth. For example, assuming the HE-LTF 825 for the STA user 2 is shorter than the HE-LTF 825 for the STA user 1, the STA user 2 can pad its HE-LTF 825 length to match that of the HE-LTF 825 for the STA user 1. Advantageously, the receiver for the AP 104 can be simplified, and redundant HE-LTFs 825 can improve channel estimation.

In some embodiments, STAs can pad the length of each HE-LTF 825 to match the longest HE-LTF 825 across each zone, but not across the entire bandwidth. For example, the STA user 2 can pad its HE-LTF 825 to match the longest HE-LTF 825 in the OFDMA zone 845, but not to match the HE-LTF 825 for the user 1, which is in a different zone. Accordingly, overhead for OFDMA users can be low, and the receiver for the AP 104 can be simplified.

In some embodiments, no STAs pay the length of the HE-LTF 825. For example, the STA user 2 can transmit a HE-LTF 825 that is shorter than the HE-LTF 825 of the STA user 1. Accordingly, overhead for the STA user 1 transmission can be reduced.

Figure 10:
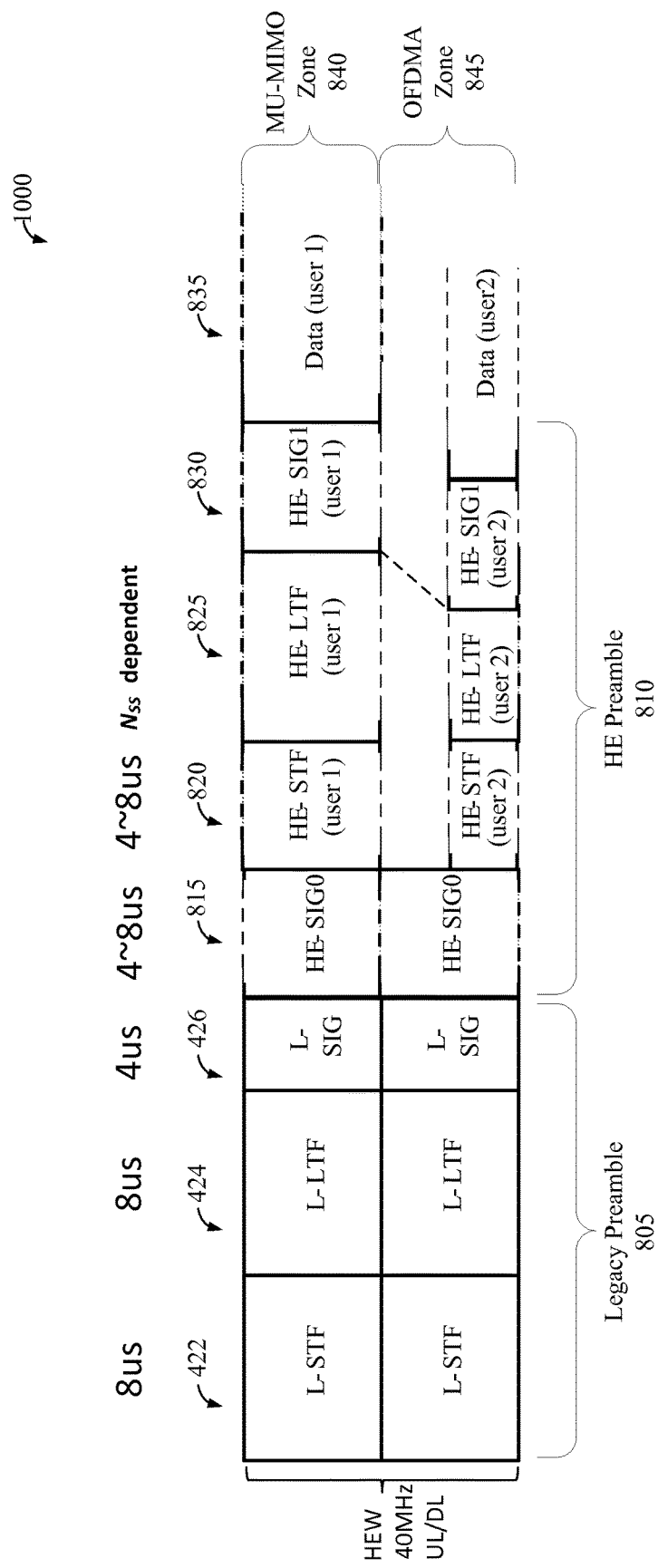
FIG. 10 illustrates another exemplary structure of an uplink physical-layer packet which can be used to enable wireless communications.

FIG. 10 illustrates another exemplary structure of an uplink physical-layer packet 1000 which can be used to enable wireless communications. In the illustrated embodiment, the physical-layer packet 1000 includes the L-STF 422, L-LTF 426, the L-SIG 426, the HE-SIG0 815, the HE-STF 820, the HE-LTF 825, the HE-SIG1 830, and the payload 835. A person having ordinary skill in the art will appreciate that the illustrated physical-layer packet 800 can include additional fields, fields can be rearranged, removed, and/or resized, and the contents of the fields varied. As shown in FIG. 10, the HE-LTF 825 for the STA user 2 is shorter than the HE-LTF 825 for the STA user 1, and the two are not aligned.

HE-SIG1 Field

Referring back to FIG. 8, in one embodiment, the packet 800 can omit the HE-SIG1 fields 830, thereby reducing overhead. In another embodiment, the packet 800 includes the HE-SIG1 fields 830. Including the HE-SIG1 fields 830 can advantageously convey additional information (such as, for example, modulation and control scheme parameters, etc.).

Figure 11:
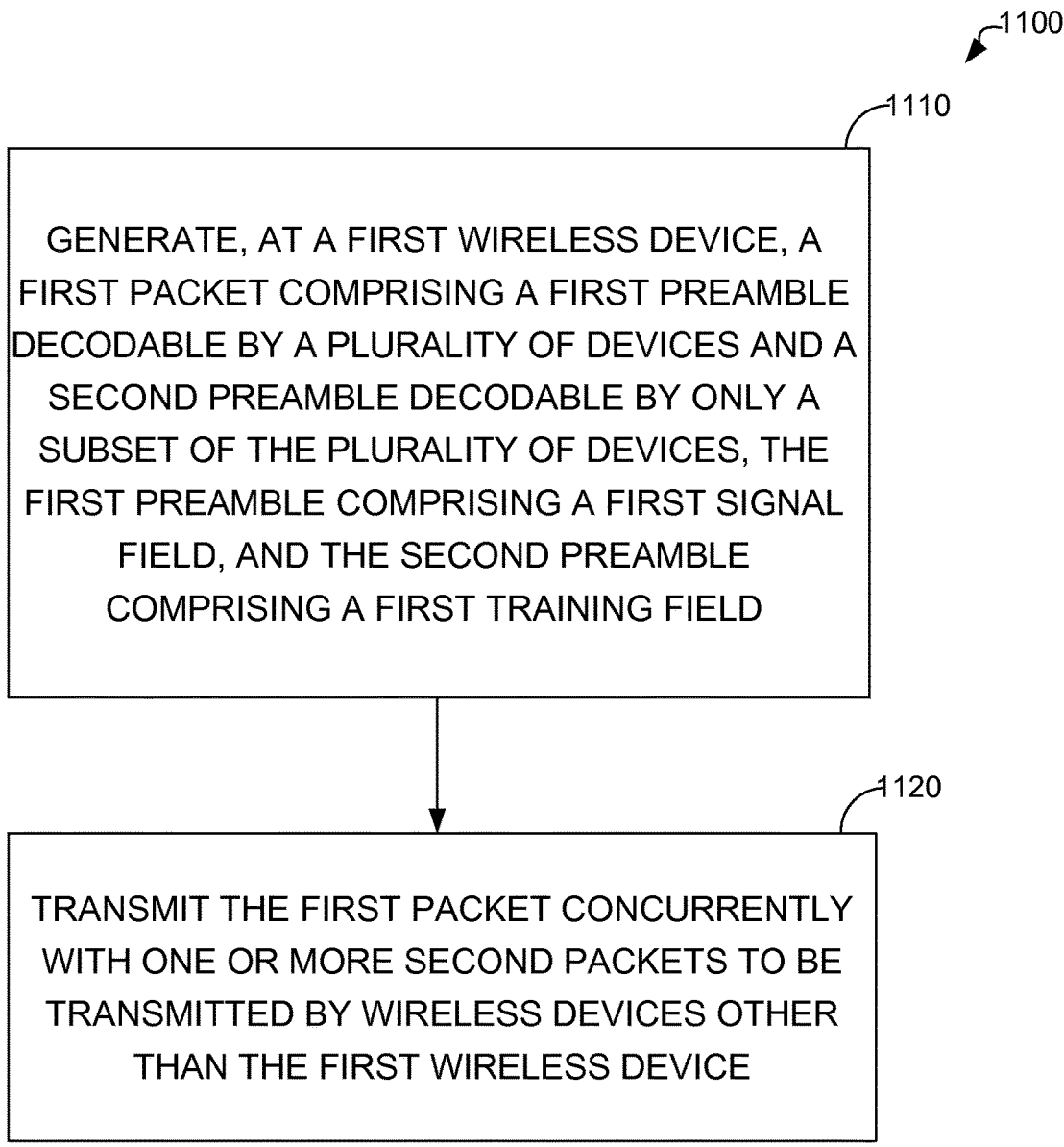
FIG. 11 shows another flowchart for an exemplary method of wireless communication that can be employed within the wireless communication system of FIG. 1.

FIG. 11 shows another flowchart 1100 for an exemplary method of wireless communication that can be employed within the wireless communication system 110 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1 and the packets 800, 900A-900C, and 1000 discussed above with respect to FIGS. 8-10, a person having ordinary skill in the art will appreciate that the illustrated method can be implemented by another device described herein, or any other suitable device (such as the STA 106 and/or the AP 104). Although the illustrated method is described herein with reference to a particular order, in various embodiments, blocks herein can be performed in a different order, or omitted, and additional blocks can be added.

First, at block 1110, a first wireless device generates a first packet including a first preamble decodable by a plurality of devices and a second preamble decodable by only a subset of the plurality of devices. For example, the STA 106 can generate the packet 800, which can include the legacy preamble 805 and the HE preamble 810. In various embodiments, the legacy preamble 805 can correspond to the first preamble and the HE preamble 810 can correspond to the second preamble.

The first preamble includes a first signal field. For example, the legacy preamble 805 includes the L-SIG 426, which can correspond to the first signal field. The second preamble includes a first training field. For example, the HE preamble 810 includes the HE-LTF 825, which can correspond to the first training field.

In various embodiments, the first signal field can include an immediate response presence and/or duration indication. In various embodiments, the first signal field can include a transmit power indication. In various embodiments, the first signal field can include a partial time synchronization function (TSF).

In various embodiments, the first signal field can include a transmit opportunity (TXOP) bandwidth (BW) and/or primary channel offset indication. In various embodiments, the first signal field can include a partial base station identifier (BSSID). In various embodiments, the first signal field can include a partial receiver association identifier (AID).

In various embodiments, the first signal field can include a partial transmitter association identifier (AID). In various embodiments, the first signal field can include an uplink/downlink indication. In various embodiments, the uplink/downlink indication can be implicit in a transmitter or receiver association identifier (AID).

Next, at block 1120, the wireless device transmits the first packet concurrently with one or more second packets to be transmitted by wireless devices other than the first wireless device. For example, the STA user 1 can transmit the UL packet 800 concurrently with the STA user 2. The wireless device can transmit the first packet, for example, on a different physical or logical channel as the wireless devices other than the first wireless device. In some embodiments, the same channel can be used for at least a portion of the packet 800 (for example, the L-SIG 426).

In various embodiments, the method can further include transmitting the first signal field over a channel bandwidth up to a full channel bandwidth size assigned to the first wireless device. For example, the STA user 2 can be assigned only a portion of the lower 20 MHz channel (for example, 10 MHz), as illustrated in FIG. 8. The STA user 2 can round the assigned 10 MHz channel up to the nearest full channel size, for example 20 MHz. Thus, the user 2 can transmit the L-SIG 426 over the lower 20 MHz channel In various embodiments, the method can further include, when the first wireless device is not assigned use of a channel designated as a primary channel, transmitting the first signal field over the channel designated as the primary channel. For example, the STA user 2 can transmit the L-SIG 426 on the upper 20 MHz channel, in addition to the lower 20 MHz channel to which it's assigned, when the upper 20 MHz channel is the primary channel.

In various embodiments, the method can further include transmitting the first signal field over an available channel bandwidth including one or more channels not assigned for use by the first wireless device. In various embodiments, the available channel bandwidth can be an entirety of the available channel bandwidth. For example, the STA user 2 can transmit the L-SIG 426 on all 40 MHz of available bandwidth.

In various embodiments, a length of the first packet can be shorter than a length of at least one second packet to be transmitted by a second wireless device assigned to a common zone with the first wireless device. The method can further include setting the first signal field to indicate a length of the first packet equal to a length of a longest of the at least one second packet to be transmitted by the second wireless device assigned to the common zone with the first wireless device. The method can further include padding the first packet for transmission to equal the length of the longest of the at least one second packet to be transmitted by the second wireless device assigned to the common zone with the first wireless device.

In various embodiments, a length of the first packet can be shorter than a length of at least one second packet to be transmitted by a second wireless device assigned to a different zone from the first wireless device. The method can further include setting the first signal field to indicate a length of the first packet equal to a length of a longest of the at least one second packet to be transmitted by the second wireless device being assigned to any zone including a commonly assigned zone with the first wireless device. The method can further include padding the first packet for transmission to equal the length of the longest of the at least one second packet to be transmitted by the second wireless device being assigned to any zone including a commonly assigned zone with the first wireless device.

In various embodiments, a length of the first packet can be shorter than a length of at least one second packet to be transmitted by a second wireless device. The method can further include the method can further include refraining from padding the first packet.

In various embodiments, the second preamble can further include a second signal field. For example, the HE preamble 810 can include the HE-SIG0 field 815, which can correspond to the second signal field. In various embodiments, the HE-SIG0 field 815 can be one symbol in length.

In various embodiments, the second preamble can further include a full or partial repetition of the first signal field, and a second signal field. For example, the HE preamble 810 can include the RL-SIG 910, which can correspond to the partial (or at least partial) repetition of the L-SIG 426. The HE preamble 810 can include the HE-SIG0 field 815, which can correspond to the second signal field. In some embodiments, the repetition of the first signal field can be included in the first portion instead. In various embodiments, the second preamble can further include a repetition of even or odd tones of the first signal field, and a second signal field.

In various embodiments, the method can further include encoding one or more bits in a polarity of the full or partial repetition of the first signal field. For example, to encode a 1, the STA 106 can multiply the repeated bits in the L-SIG 426 by −1, to encode a 0, the STA 106 can multiply the repeated bits in the L-SIG 426 by 1, and so on. In various embodiments, positive and negative repetition polarities can represent 0 and 1, respectively. In other embodiments, different encodings are possible.

In various embodiments, the second preamble can further include a second signal field and a repetition of the second signal field. For example, the HE preamble 810 can include the HE-SIG0 field 815, which can correspond to the second signal field. In various embodiments, the second preamble can further include a second training field, the second training field shorter than the first training field. For example, the HE preamble 810 can include the RHE-SIG0 field 915, which can correspond to the repeated second signal field.

In various embodiments, a length of the first training field can be shorter than a length of at least one training field to be transmitted by the second wireless device assigned to the common zone with the first wireless device. The method can further include padding the first training field to align a boundary of all training fields to be transmitted by the second wireless device assigned to the common zone with the first wireless device. For example, the STA user 2 can pad its HE-LTF 825 to match the length of the HE-LTF 825 for another user in the OFDMA zone 845.

In various embodiments, a length of the first training field can be shorter than a length of at least one training field to be transmitted by a second wireless device being assigned to any zone including a commonly assigned zone with the first wireless device. The method can further include padding the first training field to align a boundary of all training fields to be transmitted by a second wireless device being assigned to any zone including a commonly assigned zone with the first wireless device. For example, the STA user 2 can pad its HE-LTF 825 to match the length of the HE-LTF 825 for the STA user 1.

In various embodiments, a length of the first training field can be shorter than a length of at least one training field to be transmitted by a second wireless device. The method can further include refraining from padding the first training field. In various embodiments, the second preamble can further include a third signal field. For example, the STA user 2 can refrain from padding the HE-LTF 825, as shown in FIG. 10.

In an embodiment, the method shown in FIG. 11 can be implemented in a wireless device that can include a generating circuit and a transmitting circuit. Those skilled in the art will appreciate that a first wireless device can have more components than the simplified wireless device described herein. The wireless device described herein includes only those components useful for describing some prominent features of implementations within the scope of the claims.

The generating circuit can be configured to generate the packet. In some embodiments, the generating circuit can be configured to perform at least block 1110 of FIG. 11. The generating circuit can include one or more of the processor 204 (FIG. 2), the memory 206 (FIG. 2), and the DSP 220 (FIG. 2). In some implementations, means for generating can include the generating circuit.

The transmitting circuit can be configured to transmit the packet. In some embodiments, the transmitting circuit can be configured to perform at least block 1120 of FIG. 11. The transmitting circuit can include one or more of the transmitter 210 (FIG. 2), the antenna 216 (FIG. 2), and the transceiver 214 (FIG. 2). In some implementations, means for transmitting can include the transmitting circuit.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above can also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it can be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of wireless communication, comprising:
generating, at a first wireless device, a first packet comprising a first preamble decodable by a plurality of devices and a second preamble decodable by only a subset of the plurality of devices, the first preamble comprising a first signal field, and the second preamble comprising a first training field;
transmitting, by the first wireless device, the first packet concurrently with transmission of at least one second packet by at least one other wireless device, a length of the first packet being shorter than a length of the at least one second packet, and the at least one other wireless device being assigned to a common zone with the first wireless device; and
setting, by the first wireless device, the first signal field to indicate a length of the first packet equal to a length of a longest of the at least one second packet.

2. The method of claim 1, further comprising transmitting the first signal field over a channel bandwidth up to a full channel bandwidth size assigned to the first wireless device.

3. The method of claim 1, further comprising, when the first wireless device is not assigned use of a channel designated as a primary channel, transmitting the first signal field over the channel designated as the primary channel.

4. The method of claim 1, further comprising transmitting the first signal field over an available channel bandwidth including one or more channels not assigned for use by the first wireless device.

5. The method of claim 4, wherein the available channel bandwidth is an entirety of the available channel bandwidth.

6. The method of claim 1, wherein setting the first signal field to indicate the length of the first packet equal to the length of the longest of the at least one second packet comprises padding the first packet to equal the length of the longest of the at least one second packet.

7. The method of claim 1, wherein the at least one other device is assigned to any zone including the common zone.

8. The method of claim 1, further comprising refraining from padding the first packet.

9. The method of claim 1, wherein the second preamble further comprises a second signal field.

10. The method of claim 9, wherein the second signal field is one symbol in length.

11. The method of claim 1, wherein the second preamble further comprises a full or partial repetition of the first signal field, and a second signal field.

12. The method of claim 11, further comprising encoding one or more bits in a polarity of the full or partial repetition of the first signal field.

13. An apparatus configured to wirelessly communicate, comprising:
a processor configured to generate a first packet comprising a first preamble decodable by a plurality of devices and a second preamble decodable by only a subset of the plurality of devices, the first preamble comprising a first signal field, and the second preamble comprising a first training field; and
a transmitter configured to transmit the first packet concurrently with transmission of at least one training field by at least one other wireless device, a length of the first packet being shorter than a length of the at least one training field, and the at least one other wireless device being assigned to a common zone with the apparatus,
the processor being further configured to set the first signal field to indicate a length of the first packet equal to a length of a longest of the at least one training field.

14. The apparatus of claim 13, wherein the second preamble further comprises a repetition of even or odd tones of the first signal field, and a second signal field.

15. The apparatus of claim 13, wherein the second preamble further comprises a second signal field and a repetition of the second signal field.

16. The apparatus of claim 13, wherein the second preamble further comprises a second training field, the second training field shorter than the first training field.

17. The apparatus of claim 13, wherein the at least one other wireless device is assigned to any zone including the common zone, and the processor is further configured to pad the first training field to align a boundary of all training fields transmitted by the at least one other wireless device.

18. The apparatus of claim 13, the processor being further configured to refrain from padding the first training field.

19. The apparatus of claim 13, wherein the second preamble further comprises a second signal field, and a repetition of the second signal field based, at least in part, on one of: a protection method used for a third signal field of the second portion; a compression method used for the first training field; and a prefix of a payload of the first packet.

20. The apparatus of claim 13, wherein the first signal field comprises an immediate response presence and/or duration indication.

21. The apparatus of claim 13, wherein the first signal field comprises a transmit power indication.

22. The apparatus of claim 13, wherein the first signal field comprises a partial time synchronization function (TSF).

23. The apparatus of claim 13, wherein the first signal field comprises a transmit opportunity (TXOP) bandwidth (BW) and/or primary channel offset indication.

24. The apparatus of claim 13, wherein the first signal field comprises a partial base station identifier (BSSID).

25. The apparatus of claim 13, wherein the first signal field comprises an uplink/downlink indication.

26. An apparatus for wireless communication, comprising:
    means for generating a first packet comprising a first preamble decodable by a plurality of devices and a second preamble decodable by only a subset of the plurality of devices, the first preamble comprising a first signal field, and the second preamble comprising a first training field;
    means for transmitting the first packet concurrently with transmission of at least one training field by at least one other wireless device, a length of the first packet being shorter than a length of the at least one training field, and the at least one other wireless device being assigned to a common zone with the apparatus; and
    means for setting the first signal field to indicate a length of the first packet equal to a length of a longest of the at least one training field.

27. A non-transitory computer-readable medium comprising code that, when executed, causes an apparatus to:
    generate a first packet comprising a first preamble decodable by a plurality of devices and a second preamble decodable by only a subset of the plurality of devices, the first preamble comprising a first signal field, and the second preamble comprising a first training field;
    transmit the first packet concurrently with transmission of at least one training field by at least one other wireless device, a length of the first packet being shorter than a length of the at least one training field, and the at least one other wireless device being assigned to a common zone with the apparatus; and
    set the first signal field to indicate a length of the first-packet equal to a length of a longest of the at least one training field.

* * * * *